(12) United States Patent
Nishiyama et al.

(10) Patent No.: US 7,350,223 B2
(45) Date of Patent: *Mar. 25, 2008

(54) MULTI-MEDIA DATA AUTOMATIC DELIVERY SYSTEM

(75) Inventors: Kiyoharu Nishiyama, Saitama (JP); Kunikazu Tsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 194 days.

This patent is subject to a terminal disclaimer.

(21) Appl. No.: 10/796,178

(22) Filed: Mar. 10, 2004

(65) Prior Publication Data

US 2004/0172655 A1 Sep. 2, 2004

Related U.S. Application Data

(62) Division of application No. 09/238,639, filed on Jan. 28, 1999, now Pat. No. 6,725,460.

(30) Foreign Application Priority Data

Jan. 31, 1998 (JP) .................................. 10-033681
Dec. 21, 1998 (JP) .................................. 10-362476

(51) Int. Cl.
*H04N 7/173* (2006.01)

(52) U.S. Cl. ........................ 725/97; 725/98; 725/116; 725/117; 725/146; 725/147; 725/9; 725/12; 725/14; 725/22; 725/32

(58) Field of Classification Search .................. 725/22, 725/32–36, 86, 95–96, 100, 110, 114, 122, 725/134, 142, 12; 709/206–207; 705/14, 705/16; 348/722; 715/716, 733
See application file for complete search history.

(56) References Cited

U.S. PATENT DOCUMENTS 4,642,758 A 2/1987 Teng (Continued)

FOREIGN PATENT DOCUMENTS

EP 0 772 339 5/1997

(Continued)

*Primary Examiner*—Christopher Grant
*Assistant Examiner*—Oschta Montoya
(74) *Attorney, Agent, or Firm*—Oblon, Spivak, McClelland, Maier & Neustadt, P.C.

(57) ABSTRACT

A system for delivering contents includes a center system which delivers the contents, a plurality of terminal systems which receive the contents from the center system and displays the contents, and communication lines connecting the center system to the plurality of terminal systems. The center system includes a delivery-schedule setting unit which sets a schedule of delivery, and a contents-delivery unit which delivers the contents to the terminal systems according to the schedule of delivery during a time period when a load on the terminal systems is lower than a predetermined level.

14 Claims, 17 Drawing Sheets

U.S. PATENT DOCUMENTS

| | | |
|---|---|---|
| 5,099,319 A | 3/1992 | Esch et al. |
| 5,264,933 A * | 11/1993 | Rosser et al. ............... 348/722 |
| 5,305,195 A | 4/1994 | Murphy |
| 5,412,416 A | 5/1995 | Nemirofsky |
| 5,543,856 A * | 8/1996 | Rosser et al. ................ 725/32 |
| 5,550,863 A | 8/1996 | Yurt et al. |
| 5,557,320 A | 9/1996 | Krebs |
| 5,761,601 A | 6/1998 | Nemirofsky et al. |
| 5,774,170 A | 6/1998 | Hite et al. |
| 5,892,535 A | 4/1999 | Allen et al. |
| 5,946,646 A | 8/1999 | Schena et al. |
| 6,021,307 A | 2/2000 | Chan |
| 6,029,045 A | 2/2000 | Picco et al. |
| 6,075,551 A | 6/2000 | Berezowski et al. |
| 6,082,500 A | 7/2000 | Amo et al. |
| 6,160,989 A | 12/2000 | Hendricks et al. |
| 6,230,325 B1 | 5/2001 | Iinuma et al. |
| 6,725,460 B1 * | 4/2004 | Nishiyama et al. ........... 725/32 |

FOREIGN PATENT DOCUMENTS

| | | |
|---|---|---|
| EP | 0 788 289 | 8/1997 |
| JP | 9-83565 | 3/1997 |
| JP | 9-102944 | 4/1997 |
| JP | 9-139933 | 5/1997 |
| JP | 10-004379 | 1/1998 |
| WO | WO 9403995 A1 * | 2/1994 |
| WO | WO 96/11436 | 4/1996 |

* cited by examiner

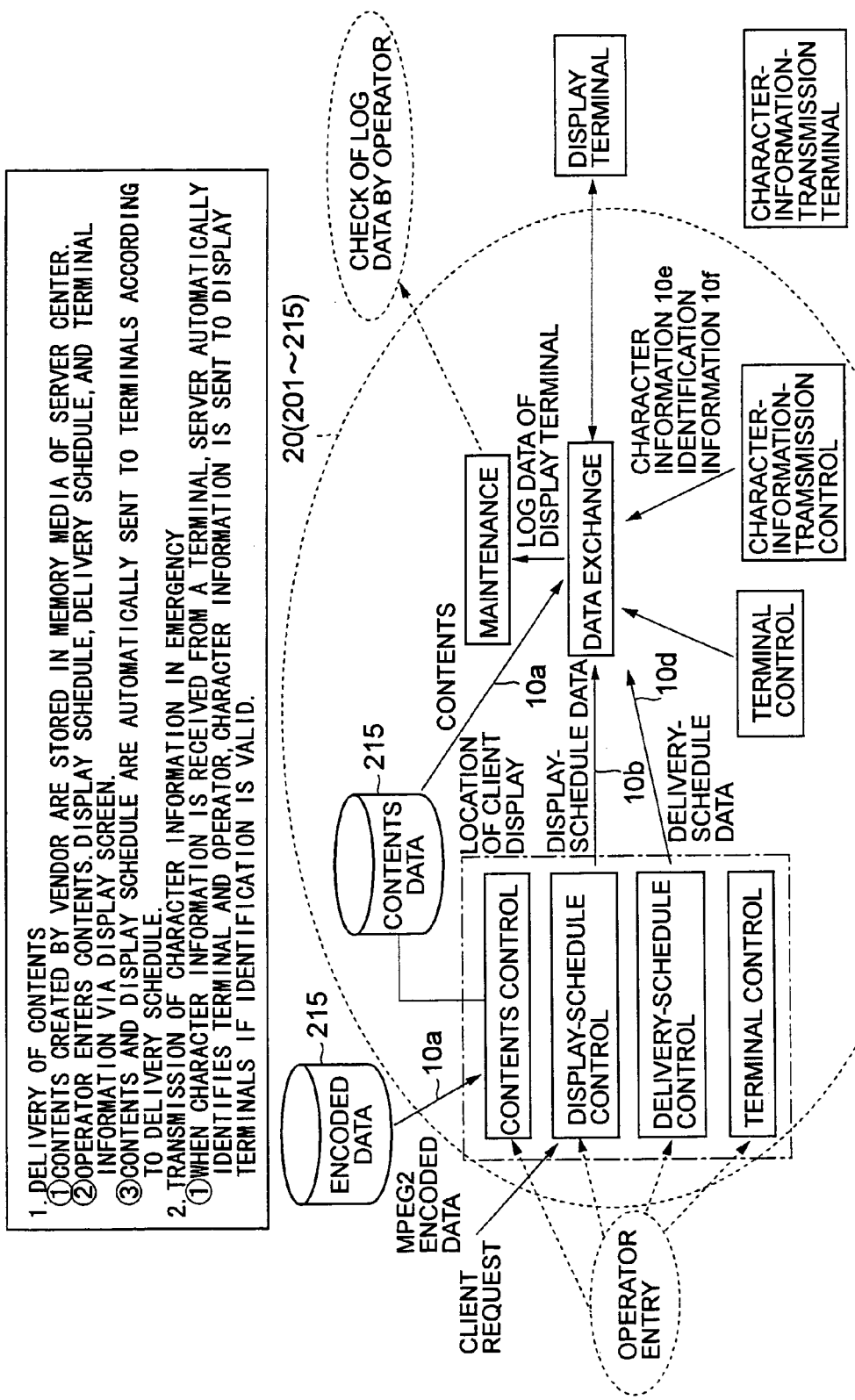

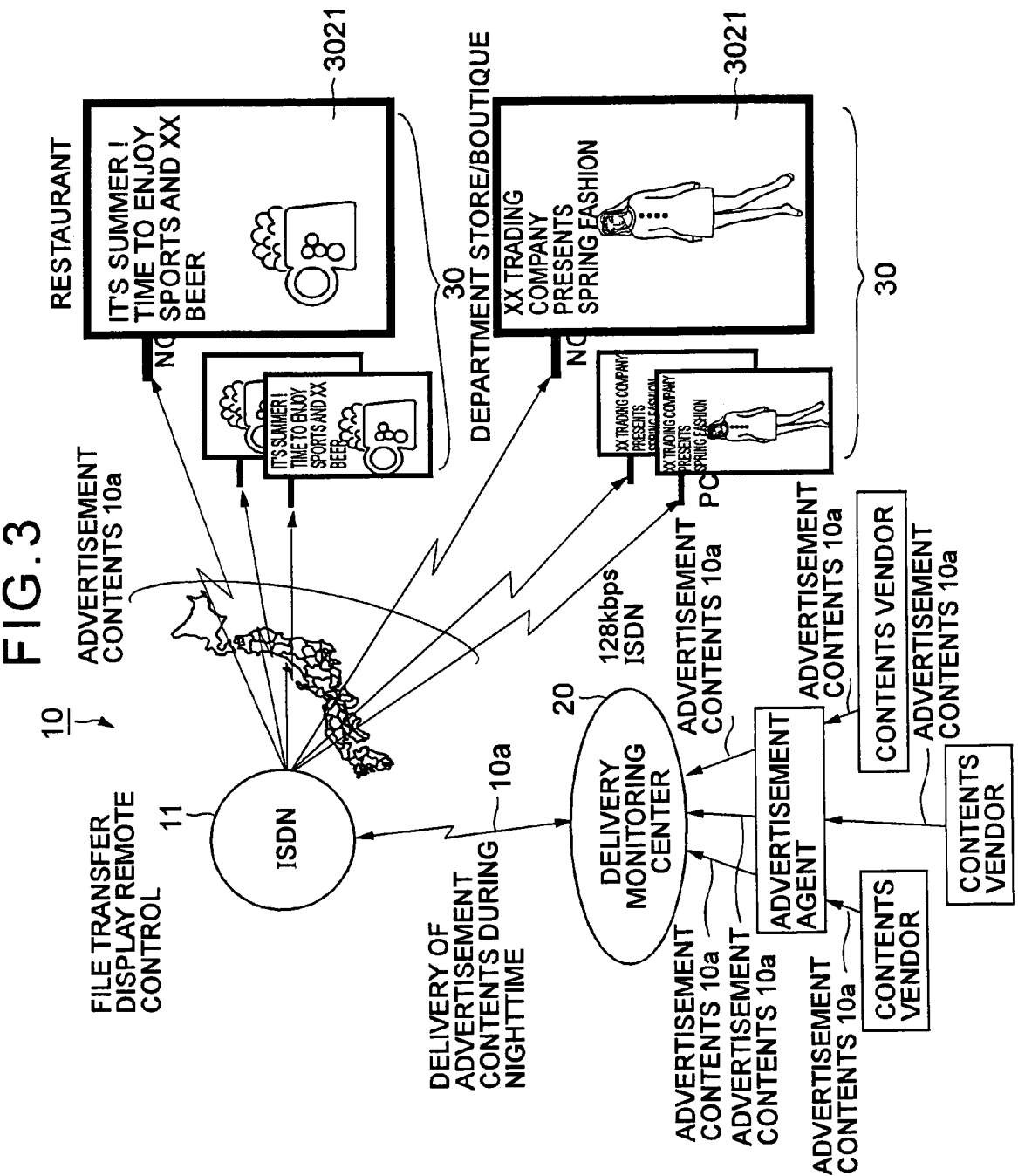

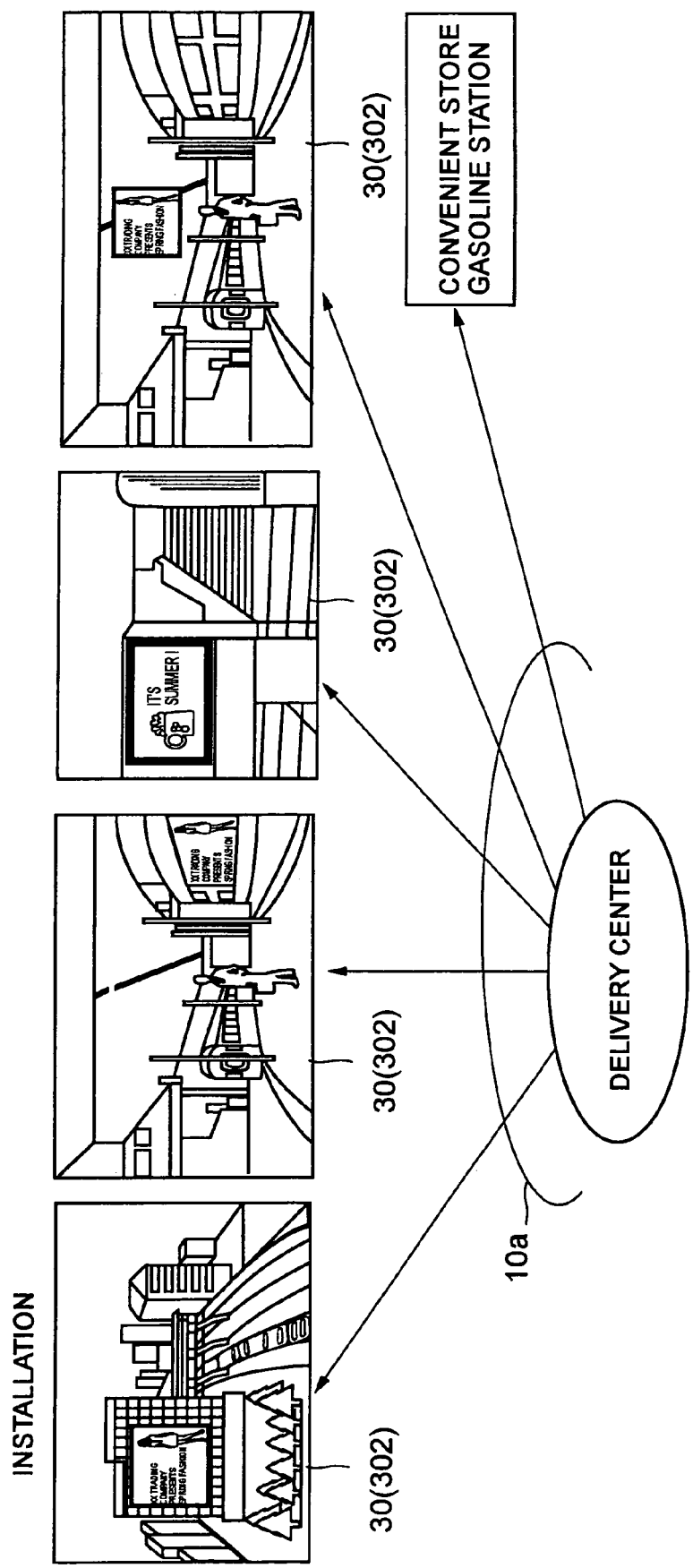

MULTI-MEDIA DATA AUTOMATIC DELIVERY SYSTEM

CROSS-REFERENCE TO RELATED APPLICATIONS

This application is a Divisional of U.S. patent application Ser. No. 09/23 8,639, filed Jan. 28, 1999, and claims priority to Japanese Patent Application No. 10-033681, filed Jan. 31, 1998, and Japanese Patent Application No. 10-362476, filed December 21, 1998. The contents of these applications are incorporated herein by reference in their entirety.

BACKGROUND OF THE INVENTION

1. Field of the Invention

The present invention generally relates to a system including a center system, terminal systems, and communication lines for the purpose of delivering and displaying contents, and particularly relates to a multi-media-automatic-delivery system in which data of moving-picture contents such as commercial advertisement is transmitted from a center system to a plurality of terminal systems via communication lines so as to display the contents on screens of the terminal systems.

2. Description of the Related Art

Surface-radio broadcasting, satellite broadcasting, and cable broadcasting are widely used to simultaneously send the identical information to general audience residing in a wide range of areas.

When information of a local nature such as local commercials or local whether information needs to be delivered to a particular local area, however, restricting the areas of delivery is rather a difficult task.

In recent years, cable television, which is directed to providing service to a local area, has made a certain progress in market. Installation, however, is required in advance with respect to dedicated adaptors, cables, and the like. Further, cable television also has a difficult technological challenge to overcome in order to deliver information to a selected area within the area of service.

An effort to overcome these problems in the related art has resulted in certain schemes. An example of such schemes is found in a Japanese Laid-open Patent Application No.10-4379 (title of the invention: Advertisement Device, Date of Filing: Jun. 14, 1996). This scheme is hereinafter called a first related-art scheme.

FIG. 16 is an illustrative drawing showing a configuration of the first related-art scheme.

The first related-art scheme includes a center 102A having a host 10A connected to a PHS terminal. This scheme further includes transit antennas 101A used for communications between the center 102A and a public telephone network, and advertisement devices 30A establishing connection with the public telephone network via the transit antennas 101A.

In this hardware configuration, information is delivered from the host 10A to the advertisement devices 30A based on telephone numbers of the advertisement devices 30A, and intervals of the delivery may be, or may not be, constant. The delivered information is displayed or output as audio information in an order of receipt of data (i.e., in an order of received records of the delivered data). Once all the delivered information is displayed or output as audio, the same operation is repeated by going back to the beginning of the data until next information arrives from the host 10A.

The advertisement devices of the first related-art scheme are supposed to be able to provide a diligent advertisement service at a low cost by use of the PHS terminal 20A and the public telephone network.

These advertisement devices may be installed at convenient stores or super markets where POS registers are located. In such locations, advertisement of sales goods, notices from a local community, traffic information, a local weather forecast, or the like can be provided in a sophisticated manner at a low cost. These features are disclosed in the above-identified document.

Another example of the schemes directed to overcoming the related-art shortcomings is use of recording media such as magneto-optical memory medium (e.g., MO disk) and magnetic disks (hard-drive disks). In this scheme, data is recorded in memory media at the host 10A, and, then, the memory media are delivered to client places where the advertisement devices 30A are located. The memory media are loaded to reading devices of the advertisement devices 30A so that the advertisement devices 30A can read the data delivered in the form of recording media. This scheme is hereinafter referred to as a second related-art scheme.

In the first related-art scheme, the load on the advertisement devices 30A is relatively light when a relatively small amount of data such as still-image information or character information is sent to the advertisement devices 30A. In such a case, a high performance is not an absolute requirement for the advertisement devices 30A.

In some cases, however, moving-picture information or high-definition images having a large amount of multi-media data in the range of several hundreds mega-bytes may need to be transmitted from the host 10A to the advertisement devices 30A when commercials on sales goods, notices from a local community, traffic information, a local weather forecast, or the like is to be delivered. In such cases, a transmission time for the delivery of information becomes unduly lengthy, resulting in an exorbitant fee being required for a lengthy use of the communication network.

In detail, 500-Mbit data, which corresponds to one minute's worth of MPEG2 video contents comprised of moving pictures and high-definition images, may be transmitted from the PHS terminal at a data rate of 32 kbs. In this case, even if the advertisement devices run almost at their full capacity, it will take at least 4 hours and 20 minutes to complete the data transmission.

In the first related-art scheme, when moving-picture information or high-definition images having a large amount of multi-media data in the range of several hundreds mega-bytes is to be transmitted from the host 10A to the advertisement devices 30A for the purpose of delivering commercials on sales goods, notices from a local community, traffic information, a local weather forecast, or the like, the load on the advertisement devices 30A is quite heavy, resulting in a need for high performance devices. Also, the communication network is required to have a high data-transfer capacity. Enhancing the speed of the advertisement devices 30A leads to a cost increase, and use of a high-speed communication network means an increase in a communication-line-usage fee. Because of this, it is difficult to adapt the first related-art scheme to multi-media applications which employs moving pictures and high-definition images.

In the second related-art scheme, data is recorded in memory media such as magneto-optical recording media or magnetic disks (hard-drive disks) at the site of the host 10A, and the memory media are delivered to client places where the advertisement devices 30A are located. The memory media are loaded to reading devices of the advertisement devices 30A so that the advertisement devices 30A can read the data delivered in the form of recording media. This configuration requires excessive time and labor, which are spent on recording and reading of the data as well as delivery of the memory media.

Moreover, the first and second related-art schemes do not provide the host 10A with a function of remote monitoring to monitor operation conditions of the advertisement devices 30A. This configuration makes it difficult for the transmission side to check whether the advertisement devices 30A are actually displaying the delivered data.

In the first and second related-art schemes, the host 10A is not provided with a function of remote control for controlling operations of the advertisement devices 30A. Because of this, it is difficult to check operations of the advertisement devices 30A individually with an aim of providing diligent delivery control, remote diagnosis, remote maintenance, etc.

Further, the first and second related-art schemes do not have a function to control a schedule regarding displaying of delivered data. This makes it difficult to customize the contents of the delivered data in accordance with such particulars as seasons, date, day, and locations where the advertisement devices 30A are installed.

Since the first and second related-art schemes do not provide a function to control a schedule regarding displaying of delivered data, it is difficult to give priority to delivered data of an urgent nature such as earthquake information, a railway accident, etc., over other delivered data.

The present invention is aimed at addressing the shortcomings described above.

First, there is a need for a scheme providing a light-load-time-period-remote-casting function which delivers contents during a nighttime when a communication fee is relatively inexpensive for the purpose of avoiding a daytime delivery because such daytime delivery would lead to an increase in a communication-line-usage fee as it takes a lengthy time to deliver a large amount of contents such as moving-picture information or high-definition images having a large amount of multi-media data in the range of several hundreds mega-bytes, which may need to be delivered from the center system to a plurality of terminal systems with an aim of delivering commercials on sales goods, notices from a local community, traffic information, a local weather forecast, or the like.

In detail, 500-Mbit data, which corresponds to one minute's worth of MPEG2 video contents comprised of moving pictures and high-definition images, may be transmitted from the PHS terminal at a data rate of 64 kbs by use of a public telephone network such as the ISDN. In this case, the light-load-time-remote-casting function of the present invention is supposed to complete the data delivery within only one hour or two.

Second, there is a need for a scheme providing a light-load-time-period-remote-casting function which delivers contents during a nighttime when terminal systems are idling, the purpose being not to require the terminal systems to have a high-performance capacity and not to require the communication network to have a high-speed-data-transfer capacity so as to avoid a cost increase associated with enhancement of the terminal systems and to avoid an increase in a communication-line-usage fee caused by use of a high-speed-data-transfer network even when moving-picture information or high-definition images having a large amount of multi-media data in the range of several hundreds mega-bytes is delivered from the center system to a plurality of terminal systems with an aim of delivering commercials on sales goods, notices from a local community, traffic information, a local weather forecast, or the like.

Third, there is a need for a scheme providing a light-load-time-period-remote-casting function which allows the transmission side to check whether delivered contents are actually displayed on terminal systems by using a remote monitoring function to monitor operations of the terminal systems.

Fourth, there is a need for a scheme providing a light-load-time-period-remote-casting function which checks operations of individual terminal systems with an aim of providing diligent delivery control, remote diagnosis, and remote maintenance by use of a remote control function to control operations of the terminal systems.

Fifth, there is a need for a scheme providing a light-load-time-period-remote-casting function which customizes the contents of the delivered data in accordance with such particulars as a season, a date, a day, and locations where the terminal systems are installed by using a function to control a schedule of displaying the contents.

Sixth, there is a need for a scheme providing a light-load-time-period-remote-casting function which gives priority to delivered data of such an urgent nature as earthquake information, a railway accident, etc., over other delivered data by using a function to control a schedule of displaying the contents.

Seventh, there is a need for a scheme providing a light-load-time-period-remote-casting function which eliminates a need for time and labor to be spent on recording of contents in memory media, delivery of the memory media, and reading of contents from the memory media, all of which would be required when the memory media is recorded at the center system, is delivered to the terminal systems, and is read by the terminal systems so as to deliver contents in the form of memory media.

SUMMARY OF THE INVENTION

Accordingly, it is a general object of the present invention to provide a scheme which can satisfy the needs described above.

According to the present invention, a system for delivering contents includes a center system which delivers the contents, a plurality of terminal systems which receive the contents from the center system and displays the contents, and communication lines connecting the center system to the plurality of terminal systems, wherein the center system includes a delivery-schedule setting unit which sets a schedule of delivery, and a contents-delivery unit which delivers the contents to the terminal systems according to the schedule of delivery during a time period when a load on the terminal systems is lower than a predetermined level.

In this manner, the system described above is provided with a light-load-time-period-remote-casting function which delivers contents during time period such as a nighttime when terminal systems are idling, the purpose being not to require the terminal systems to have a high-performance capacity and not to require the communication network to have a high-speed-data-transfer capacity so as to avoid a cost increase associated with enhancement of the terminal systems and to avoid an increase in a communication-line-usage fee caused by use of a high-speed-data-transfer network even when moving-picture information or high-definition images having a large amount of multi-media data in the range of several hundreds mega-bytes is delivered from the center system to a plurality of terminal systems with an aim of delivering commercials on sales goods, notices from a local community, traffic information, a local weather forecast, or the like.

Further, the light-load-time-period-remote-casting function can deliver the contents during a nighttime when a communication fee is relatively inexpensive for the purpose of avoiding a daytime delivery because such daytime delivery would lead to an increase in a communication-line-usage fee as it takes a lengthy time to deliver a large amount of contents such as moving-picture information or high-definition images having a large amount of multi-media data in the range of several hundreds mega-bytes.

According to another aspect of the present invention, the system as described above is such that the center system further includes a terminal-system-control unit which registers and controls terminal-attribute information about attributes of the terminal systems, wherein the contents-delivery unit selects some of the plurality of terminal systems based on the terminal-attribute information, and delivers the contents to the selected terminal systems.

In the system described above, the center system can customize the contents delivered to particular terminal systems by selecting particular terminal systems for delivering particular contents.

According to another aspect of the present invention, the system as described above is such that the center system further includes a display-schedule setting unit which sets a schedule of display, wherein the contents-delivery unit delivers the contents and the schedule of display to the terminal systems, the schedule of display defining a schedule according to which the contents are displayed on the terminal systems. Further, each of the plurality of terminal systems includes a receiving unit which receives the contents and the schedule of display from the center system, a display unit, and a terminal-control unit which displays the contents on the display unit according to a schedule specified in the schedule of display.

The system described above is provided with a remote control function to control operations of the terminal systems. Based on this function, the displayed contents can be customized in accordance with a season, a date, a day, and locations where the terminal systems are installed. Further, such a remote control function can give priority to contents of an urgent nature such as earthquake information, railway-accident information, etc., over other routine contents.

According to another aspect of the present invention, the system as described above is such that each of the plurality of terminal systems includes a receiving unit which receives the contents from the center system, a first display unit which displays the contents on a screen thereof, a monitor camera which takes a picture of the screen of the first display unit, and a still-image-transmission unit which sends the picture to the center device. Further, the center system includes a second display unit which displays a plurality of pictures of the screen of the first display unit taken at intervals during a last predetermined time period.

The system described above allows the transmission side (i.e., the center system) to check whether delivered contents are actually displayed on terminal systems by using a remote monitoring function to monitor operations of the terminal systems.

Other objects and further features of the present invention will be apparent from the following detailed description when read in conjunction with the accompanying drawings.

BRIEF DESCRIPTION OF THE DRAWINGS

FIG. 2 is an illustrative drawing for explaining the functions of a server PC;

FIG. 3 is an illustrative drawing showing an embodiment of the multi-media-automatic-delivery system according to the present invention;

FIG. 4 is an illustrative drawing of a first embodiment of the multi-media-automatic-delivery system;

DESCRIPTION OF THE PREFERRED EMBODIMENTS

Figure 1A:
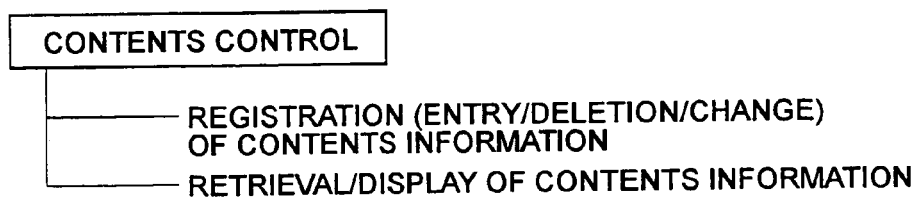
FIGS. 1A through 1I are illustrative drawings showing a list of functions provided for a center system of a multi-media-automatic-delivery system according to the present invention.
Figure 1B:
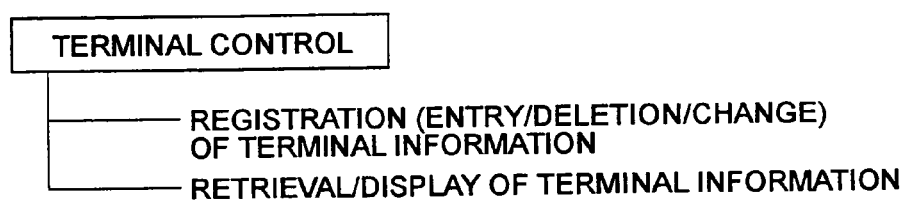
Figure 1C:
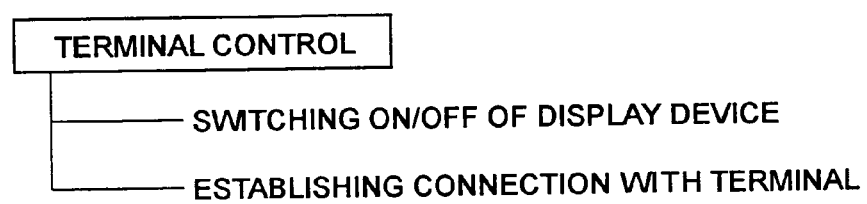
Figure 1D:
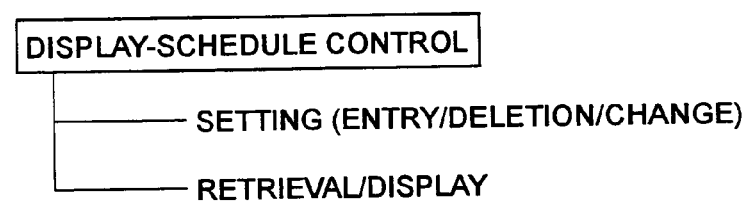
Figure 1E:
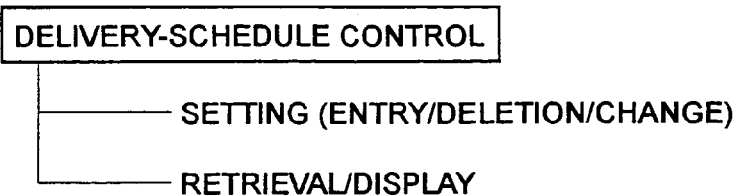
Figure 1F:
Figure 1G:
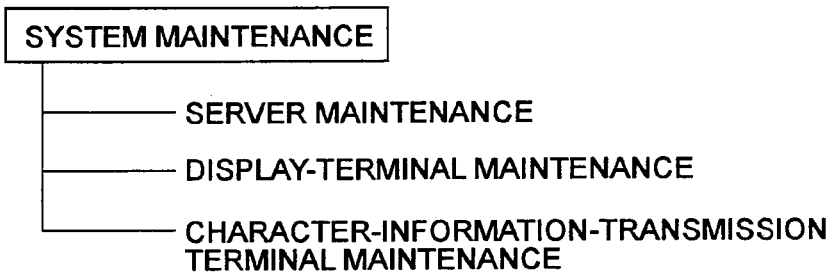
Figure 1H:
Figure 1I:
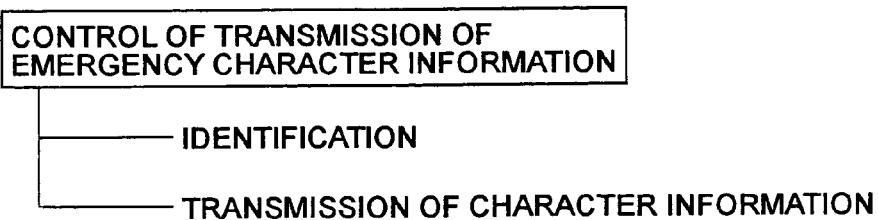

In the following, embodiments of the present invention will be described with reference to the accompanying drawings.

FIGS. 1A through 1I are illustrative drawings showing a list of functions provided for a center system (server personal computer) of a multi-media-automatic-delivery system according to the present invention. FIG. 2 is an illustrative drawing for explaining the functions of the sender system (server PC). FIG. 3 is an illustrative drawing showing an embodiment of the multi-media-automatic-delivery system according to the present invention.

A multi-media-automatic-delivery system 10 of this embodiment includes communication lines 11, at least one center system 20, and terminal systems 30 connected to the center system 20 via the communication lines 11. The center system 20 delivers contents data to the terminal systems 30 which are located at railway stations, convenience stores, etc., so that the delivered contents are shown on the display unit 302 of the terminal systems 30. The contents data include still images and video contents such as moving pictures 10a, character information 10e, etc., and may represent commercial advertisement.

Figure 15:
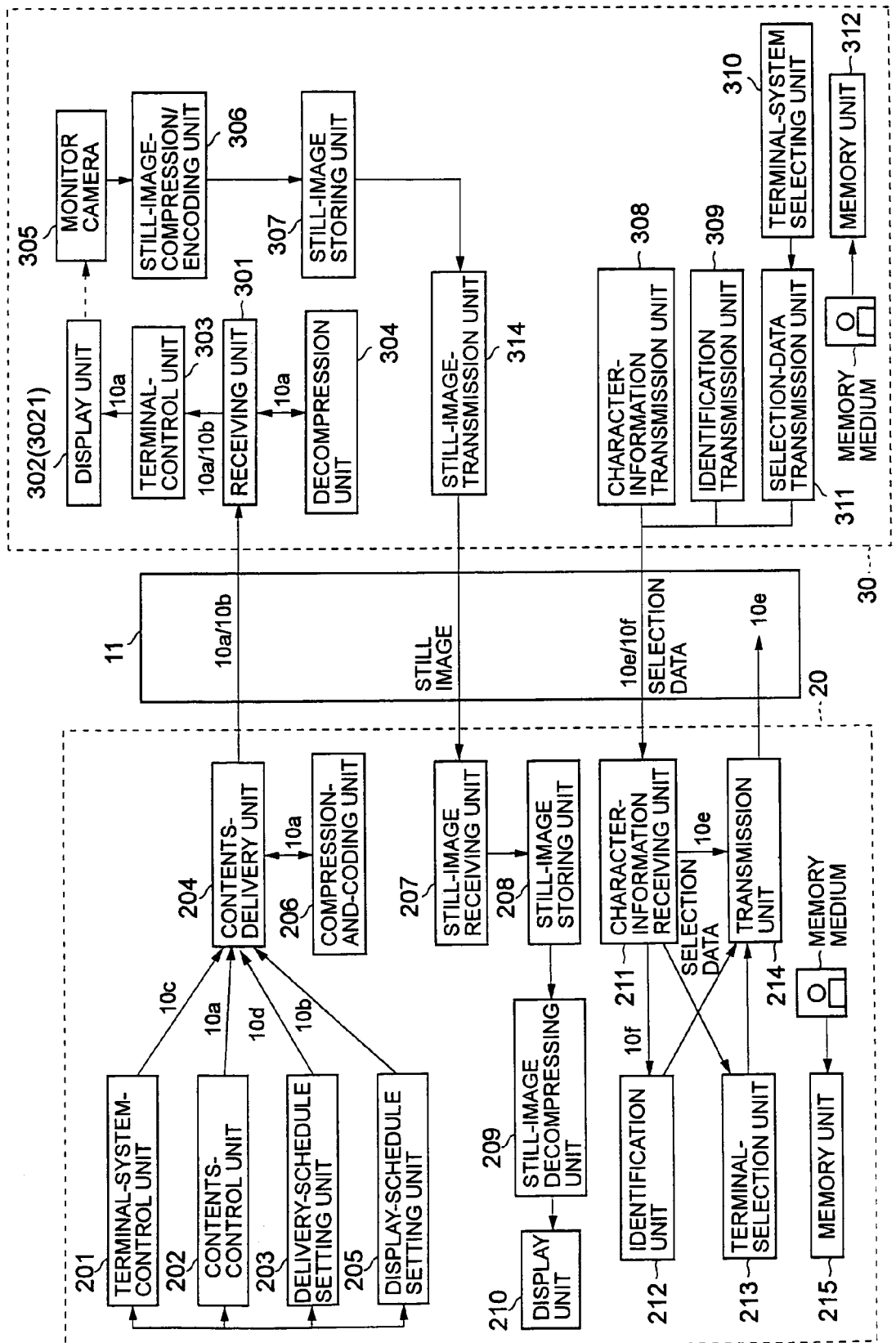
FIG. 15 is a block diagram showing a functional configuration of the center system and a given one of the terminal systems.
Figure 16:
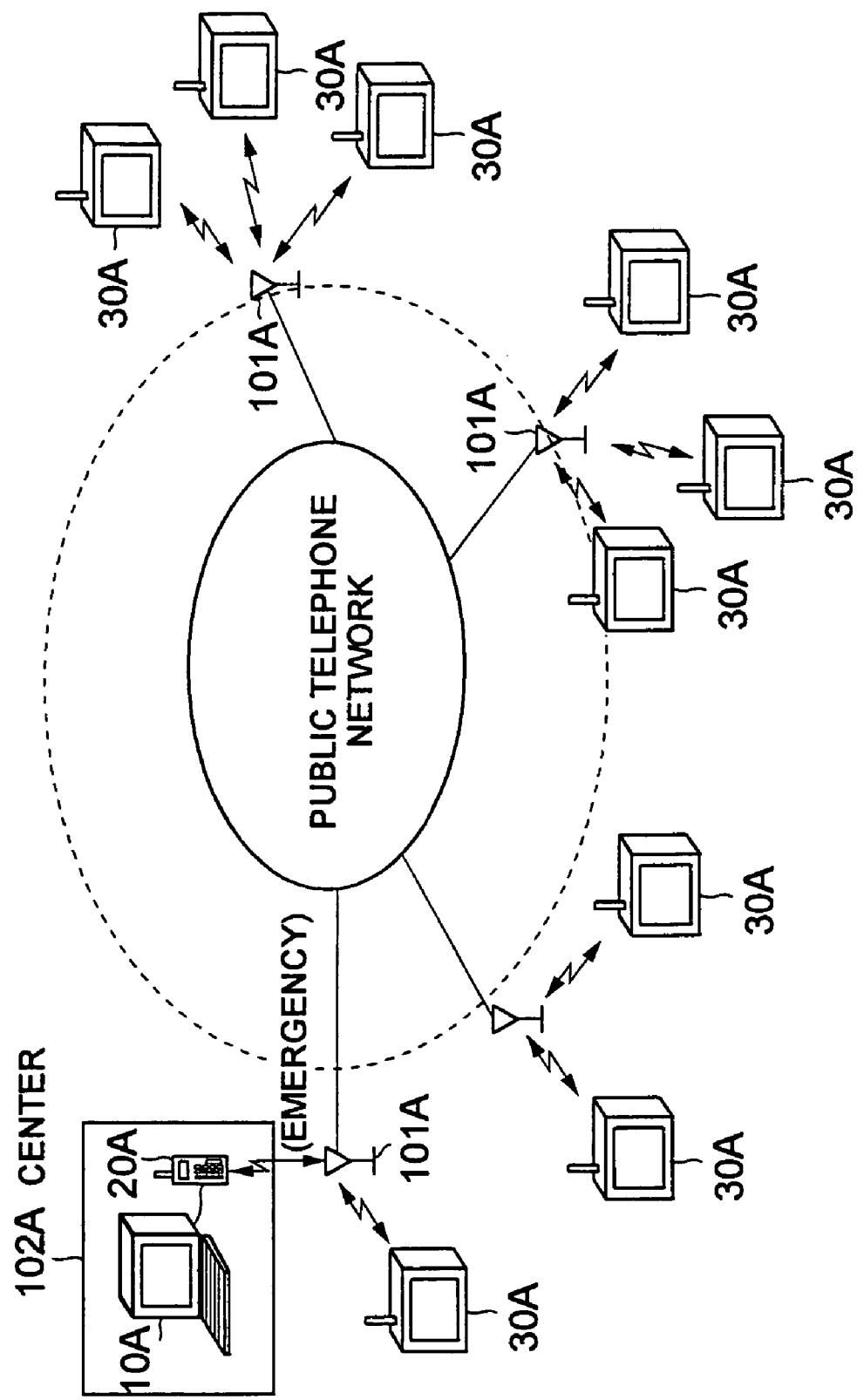
FIG. 16 is an illustrative drawing showing a configuration of a related-art scheme.

FIG. 15 is a block diagram showing a functional configuration of the center system 20 and a given one of the terminal system 30.

In the following, a description will be given with regard to a case in which the moving pictures 10a for commercial advertisement are delivered. In this embodiment, the moving pictures 10a for commercial advertisement are provided in compliance with the MPEG2 scheme, and are hereinafter referred to as moving-picture-advertisement-contents-MPEG2 data 10a. Use of the moving-picture-advertisement-contents-MPEG2 data 10a in compliance with the MPEG2 scheme makes it possible to display high-definition video images comparable to DVD (digital video disk) images on the display unit 302 of the terminal systems 30.

When such high-definition video images as comparable to those of the DVD system are delivered in this embodiment, moving-picture information or high-definition images having a large amount of multi-media data in the range of several hundreds mega-bytes is sent from the center system 20 to the terminal systems 30 for the purpose of delivering commercials on sales goods, notices from a local community, traffic information, a local weather forecast, or the like. To this end, a contents-delivery unit 204 uses terminal-attribute information 10c to select some of the terminal systems 30 to deliver the contents according to an advertisement-delivery-schedule data 10d generated by a delivery-schedule setting unit 203. The contents are delivered by using an efficient transfer scheme based on data compression during a time period when a communication-line-usage fee is relatively inexpensive. Namely, a daytime delivery of the contents is avoided since it would lead to an increase in the communication-line-usage fee for the communication lines (ISDN) 11. In this manner, a light-load-time-period-remote-casting function is implemented at a low cost so as to cope with the data amount of moving pictures or high-definition video images comparable to those of the DVD system.

In detail, 500-Mbit data comprised of moving pictures and high-definition images, which corresponds to one minute's worth of MPEG2 video contents when shown on the display unit 302 such as a large-scale plasma display or an aurora vision, may be transmitted at a data rate of 64 kbs by use of the communication (ISDN) lines 11. In this case, the light-load-time-remote-casting function of the present invention can complete the data delivery within only one hour or two.

Further, when such moving-picture information or high-definition images comparable to those of the DVD system as having a large amount of multi-media data in the range of several hundreds mega-bytes is sent from the center system 20 to the terminal systems 30 after the contents-delivery unit 204 selects the terminal systems 30 based on the terminal-attribute information 10c to deliver the contents according to the advertisement-delivery-schedule data 10d generated by the delivery-schedule setting unit 203 for the purpose of delivering commercials on sales goods, notices from a local community, traffic information, a local weather forecast, or the like, the contents are delivered by using an efficient transfer scheme based on data compression during a time period when the terminal systems 30 are idling, the purpose being not to require the terminal systems 30 to have a high-performance capacity and not to require the communication (ISDN) lines 11 to have a high-speed-data-transfer capacity so as to avoid a cost increase associated with enhancement of the terminal systems 30 and to avoid an increase in a communication-line-usage fee caused by use of a high-speed-data-transfer network. In this manner, a light-load-time-period-remote-casting function is implemented at a low cost so as to cope with the data amount of moving pictures or high-definition video images comparable to those of the DVD system.

As a result, it is possible to eliminate time and labor that would be spent on recording the contents in recording media such as magneto-optical memory media or magnetic disks at the site of the center system 20. Also, time and labor spent on the delivery of the recording media to the terminal systems 30 are eliminated. Further, there is no need to spend time and labor on loading the recording media to the reading devices of the terminal systems 30 so as to store the contents in the terminal systems 30. In this manner, a light-load-time-period-remote-casting function is implemented so as to eliminate a need for time and labor to be spent on recording of contents in memory media, delivery of the memory media, and reading of contents from the memory media.

The center system 20 includes a terminal-system-control unit 201, a contents-control unit 202, the delivery-schedule setting unit 203, the contents-delivery unit 204, a display-schedule setting unit 205, and a compression-and-coding unit 206. Basically, the center system 20 is implemented by a server personal computer. As shown in the figures (FIGS. 1A through 1I, FIG. 2, FIG. 3, and FIG. 15), the terminal-system-control unit 201 is equipped with a function to register and control the terminal-attribute information 10c regarding the terminal systems 30. The terminal-system-control unit 201 is implemented by a microcomputer provided inside the server PC.

The terminal-system-control unit 201, as shown in the figures, uses advertisement-display-schedule data 10b to achieve remote control of terminal systems 30 with regard to a display schedule thereof when the advertisement-display-schedule data 10b is sent to the terminal systems 30. When the advertisement-display-schedule data 10b after updating thereof is sent to the terminal systems 30, it is possible to change a date and time at which the moving-picture-advertisement-contents-MPEG2 data 10a is displayed on the display unit 302 such as a large-scale plasma display or an aurora vision. Also, the moving-picture-advertisement-contents-MPEG2 data 10a displayed on the display unit 302 can be changed via an emergency remote control function implemented in the manner as described above.

In this manner, the center system 20 is provided with a remote-control function to control operations of the terminal systems 30, and can check operation conditions of the individual terminal systems 30 so as to provide diligent delivery control, remote diagnosis, and remote maintenance. Further, since a function to control the advertisement-display-schedule data 10b is provided, a light-load-time-period-remote-casting function can give priority to contents of an urgent nature such as earthquake information, fire information, railway-accident information, etc., over any other contents. Namely, the advertisement-display-schedule data 10b alone can be delivered with an update thereof even after the contents were sent, so as to change the date and time of displaying of the contents at the terminal systems 30. This can be achieved economically by using existing infrastructure, whereas such a change in the date and time of displaying is not possible in the related-art schemes, which are based on either delivery of recording media or one-way delivery of contents.

As shown in the figures, the contents-control unit 202 registers the advertisement-moving-picture contents, which are to be sent to the terminal systems 30 via the communication lines 11. Further, the contents-control unit 202 is provided with a function to generate information regarding control of the registered advertisement-moving-picture contents. This is implemented by the microcomputer provided inside the server PC. The terminal-system-control unit 201 exchanges the terminal-attribute information 10c with the contents-control unit 202 so as to attend to contents-delivering processing with respect to each of the terminal systems 30 or with each group of the terminal systems 30.

In this manner, a light-load-time-period-delivery-scheduling function is implemented so as to control the advertisement-delivery-schedule data 10d and the advertisement-display-schedule data 10b. Based on this, the contents-delivery unit 204 uses the terminal-attribute information 10c to deliver the contents individually to each of the selected terminal systems 30 by taking into account a season, a date, a day, locations of the terminal systems 30, etc. Further, the contents-delivery unit 204 can customize the contents with respect to each of the terminal systems 30 based on characteristics of the terminal systems 30 as such characteristics are specified in the terminal-attribute information 10c. Such a function is implemented as the light-load-time-period-remote-casting function. Also, collaboration between the terminal-system-control unit 201 and the contents-control unit 202 makes it possible to deliver the contents with respect to the selected terminal systems 30 or with respect to a selected group of the terminal systems 30. All of this makes it possible to implement a delivery-control function which can provide individually tailored and diligent service to each of the terminal systems 30. As a result, it is possible to eliminate time and labor that would be spent on recording the contents in recording media such as magneto-optical memory media or magnetic disks at the site of the center system 20. Also, time and labor spent on the delivery of the recording media to the terminal systems 30 are eliminated. Further, there is no need to spend time and labor on loading the recording media to the reading devices of the terminal systems 30 so as to store the contents in the terminal systems 30. In this manner, a light-load-time-period-remote-casting function is implemented so as to eliminate a need for time and labor to be spent on recording of contents in memory media, delivery of the memory media, and reading of contents from the memory media.

As shown in the figures, the delivery-schedule setting unit 203 lays out a schedule of light-load-time-delivery-processing for delivering contents to the terminal systems 30 during a light-load time period when the load on the terminal systems 30 is lower than a predetermined level. This function is implemented by the microcomputer provided inside the server PC. Further, the delivery-schedule setting unit 203 refers to the advertisement-delivery-schedule data 10d that is already specified and the advertisement-display-schedule data 10b that is already transmitted, thereby controlling delivery operations for sending the advertisement-moving-picture contents.

Namely, the light-load-time-period-remote-casting function based on the delivery-schedule setting unit 203 and the display-schedule setting unit 205 allows the contents-delivery unit 204 to use the terminal-attribute information 10c to deliver the contents individually to each of the selected terminal systems 30 by taking into account a season, a date, a day, locations of the terminal systems 30, etc. Further, the contents-delivery unit 204 can customize the contents with respect to each of the terminal systems 30 based on characteristics of the terminal systems 30 as such characteristics are specified in the terminal-attribute information 10c. Such a function is implemented as the light-load-time-period-remote-casting function. Further, since a function to control the advertisement-display-schedule data 10b is provided, a light-load-time-period-remote-casting function can give priority to contents of an urgent nature such as earthquake information, fire information, railway-accident information, etc., over any other contents. As a result, it is possible to eliminate time and labor that would be spent on recording the contents in recording media such as magneto-optical memory media or magnetic disks at the site of the center system 20. Also, time and labor spent on the delivery of the recording media to the terminal systems 30 are eliminated. Further, there is no need to spend time and labor on loading the recording media to the reading devices of the terminal systems 30 so as to store the contents in the terminal systems 30. In this manner, a light-load-time-period-remote-casting function is implemented so as to eliminate a need for time and labor to be spent on recording of contents in memory media, delivery of the memory media, and reading of contents from the memory media.

The delivery-schedule setting unit 203 is provided with the light-load-time-delivery-scheduling function, which sets a schedule of contents delivery so as to deliver the advertisement-moving-picture contents to the terminal systems 30 during a light-load time period when the load on the terminal systems 30 is lower than a predetermined level, especially during a nighttime when the devices are idling or stopped. In this embodiment, public telephone lines are used as the communication lines 11. In detail, ISDN lines with a 64-kbps data-transfer rate are used (hereinafter, the communication lines 11 may be referred to as the ISDN lines 11). Because of this configuration, the terminal-attribute information 10c includes telephone numbers of the terminal systems 30 (i.e., telephone numbers of lines connected to DSUs).

When the delivery-schedule setting unit 203 sets the advertisement-delivery-schedule data 10d for delivering the moving-picture-advertisement-contents-MPEG2 data 10a to the terminal systems 30, the delivery-schedule setting unit 203 checks available time periods in the displaying schedules of the terminal systems 30, available time periods in the delivery schedule for delivering the moving-picture-advertisement-contents-MPEG2 data 10a to the terminal systems 30, and a light-load time period of the terminal systems 30. Based on this check, the delivery-schedule setting unit 203 decides appropriate time periods for delivering contents, and estimates time lengths which would be required for such deliveries. In this manner, the light-load-time-period-delivery-scheduling function is implemented so as to deliver the contents during such a time period as to warrant the lowest fee and a reliable delivery.

The light-load-time-period-delivery-scheduling function as described above can bring about the following improvements. When such moving-picture information or high-definition images comparable to those of the DVD system as having a large amount of multi-media data in the range of several hundreds mega-bytes is sent from the center system 20 to the terminal systems 30 after the contents-delivery unit 204 selects the terminal systems 30 based on the terminal-attribute information 10c to deliver the contents according to the advertisement-delivery-schedule data 10d and the advertisement-display-schedule data 10b generated at the center system 20 for the purpose of delivering commercials on sales goods, notices from a local community, traffic information, a local weather forecast, or the like, the contents are delivered by using an efficient transfer scheme based on data compression during a nighttime, the purpose being to avoid an increase in a communication-line-usage fee caused by use of the ISDN lines 11 during daytime for a long time period for delivering a large amount of the data. In this manner, the light-load-time-period-remote-casting function is implemented at a low cost so as to cope with the data amount of moving pictures or high-definition video images comparable to those of the DVD system. In detail, 500-Mbit data comprised of moving pictures and high-definition images, which corresponds to one minute's worth of MPEG2 video contents when shown on the display unit 302 such as a large-scale plasma display or an aurora vision, may be transmitted at a data rate of 64 kbs by use of the communication (ISDN) lines 11. In this case, the light-load-time-remote-casting function of the present invention can complete the data delivery within only one hour or two.

Further, when such moving-picture information or high-definition images comparable to those of the DVD system as having a large amount of multi-media data in the range of several hundreds mega-bytes is sent from the center system 20 to the terminal systems 30 after the contents-delivery unit 204 selects the terminal systems 30 based on the terminal-attribute information 10*c* to deliver the contents according to the advertisement-delivery-schedule data 10*d* and the advertisement-display-schedule data 10*b* generated at the center system 20 for the purpose of delivering commercials on sales goods, notices from a local community, traffic information, a local weather forecast, or the like, the contents are delivered by using an efficient transfer scheme based on data compression during a light-load time period such as a nighttime when the terminal systems 30 are idling, the purpose being not to require the terminal systems 30 to have a high-performance capacity and not to require the communication lines to have a high-speed-data-transfer capacity so as to avoid a cost increase associated with enhancement of the terminal systems 30 and to avoid an increase in a communication-line-usage fee caused by use of a high-speed-data-transfer network. In this manner, the light-load-time-period-remote-casting function is implemented at a low cost so as to cope with the data amount of moving pictures or high-definition video images comparable to those of the DVD system. This remote-delivery function directed to delivery of high-definition moving pictures (i.e., the light-load-time-period-remote-casting function) can be achieved economically by using existing infrastructure, whereas such a function cannot be implemented in the related-art schemes which are based on either delivery of recording media or one-way delivery of contents.

As shown in the figures, the contents-delivery unit 204 selects the advertisement-moving-picture contents based on the advertisement-contents-conrol information so as to deliver the contents to the terminal systems 30 during a time period such as a nighttime when the device operation is in a halt condition or in an idling condition. To deliver the contents, the contents-delivery unit 204 accesses the terminal systems 30 via the ISDN lines 11 based on the terminal-attribute information 10*c* regarding the terminal systems 30 (i.e., calls the DSUs of the terminal systems 30), and attends to light-load-time-period-delivery processing for sending the advertisement-moving-picture contents to the terminal systems 30 during a light-load-time period such as a nighttime. In this manner, the light-load-time-period-remote-casting function is implemented.

Accordingly, when such moving-picture information or high-definition images comparable to those of the DVD system as having a large amount of multi-media data in the range of several hundreds mega-bytes is sent from the center system 20 to the terminal systems 30 after the contents-delivery unit 204 selects the terminal systems 30 based on the terminal-attribute information 10*c* to deliver the contents according to the advertisement-delivery-schedule data 10*d* generated by the delivery-schedule setting unit 203 for the purpose of delivering commercials on sales goods, notices from a local community, traffic information, a local weather forecast, or the like, the contents are delivered by using an efficient transfer scheme based on data compression during a nighttime, the purpose being to avoid an increase in a communication-line-usage fee caused by use of the ISDN lines 11 during a daytime for a long time period for delivering a large amount of the data. In this manner, the light-load-time-period-remote-casting function is implemented at a low cost so as to cope with the data amount of moving pictures or high-definition video images comparable to those of the DVD system. In detail, 500-Mbit data comprised of moving pictures and high-definition images, which corresponds to one minute's worth of MPEG2 video contents when shown on the display unit 302 such as a large-scale plasma display or an aurora vision, may be transmitted at a data rate of 64 kbs by use of the communication (ISDN) lines 11. In this case, the light-load-time-remote-casting function of the present invention can complete the data delivery within only one hour or two.

Further, when such moving-picture information or high-definition images comparable to those of the DVD system as having a large amount of multi-media data in the range of several hundreds mega-bytes is sent from the center system 20 to the terminal systems 30 after the contents-delivery unit 204 selects the terminal systems 30 based on the terminal-attribute information 10*c* to deliver the contents according to the advertisement-delivery-schedule data 10*d* generated by the delivery-schedule setting unit 203 for the purpose of delivering commercials on sales goods, notices from a local community, traffic information, a local weather forecast, or the like, the contents are delivered by using an efficient transfer scheme based on data compression during a time period such as a nighttime when the terminal systems 30 are idling, the purpose being not to require the terminal systems 30 to have a high-performance capacity and not to require the communication lines to have a high-speed-data-transfer capacity so as to avoid a cost increase associated with enhancement of the terminal systems 30 and to avoid an increase in a communication-line-usage fee caused by use of a high-speed-data-transfer network. In this manner, a light-load-time-period-remote-casting function is implemented at a low cost so as to cope with the data amount of moving pictures or high-definition video images comparable to those of the DVD system. As a result, it is possible to eliminate time and labor that would be spent on recording the contents in recording media such as magneto-optical memory media or magnetic disks at the site of the center system 20. Also, time and labor spent on the delivery of the recording media to the terminal systems 30 are eliminated. Further, there is no need to spend time and labor on loading the recording media to the reading devices of the terminal systems 30 so as to store the contents in the terminal systems 30. In this manner, the light-load-time-period-remote-casting function is implemented so as to eliminate a need for time and labor to be spent on recording of contents in memory media, delivery of the memory media, and reading of contents from the memory media. This remote-delivery function directed to delivery of high-definition moving pictures (i.e., the light-load-time-period-remote-casting function) can be achieved economically by using existing infrastructure, whereas such a function cannot be implemented in the related-art schemes which are based on either delivery of recording media or one-way delivery of contents.

As shown in the figures, the contents-delivery unit 204 selects the advertisement-moving-picture contents based on the advertisement-contents-control information so as to deliver the contents to the terminal systems 30 based on the advertisement-delivery-schedule data 10*d* during the light-load time period. To deliver the contents, the contents-delivery unit 204 accesses the terminal systems 30 via the ISDN lines 11 by performing a communication-line establishing process based on the telephone-number information (i.e., calls the DSUs of the terminal systems 30), and attends to light-load-time-period-delivery processing for sending the advertisement-moving-picture contents to the terminal systems 30 via the ISDN lines 11 during the light-load time period based on the advertisement-delivery-schedule data 10*d* regarding the terminal systems 30. In this manner, the light-load-time-period-remote-casting function is implemented. In this embodiment, this function is performed by the microcomputer of the server PC.

In this manner, the remote control function is provided for the purpose of controlling operations of the terminal systems 30 from the center system 20 when the terminal systems 30 are selected based on the telephone-number information. Namely, the operation conditions of the terminal systems 30 can be checked individually so as to provide diligent delivery control, remote diagnosis, and remote maintenance with respect to each of the terminal systems 30. Such a light-load-time-period-remote-casting function provides a maintenance-free condition for the terminal systems 30.

Further, a function is provided to control the advertisement-delivery-schedule data 10*d* regarding the terminal systems 30 selected based on the telephone-number information. Based on this, the contents-delivery unit 204 uses the terminal-attribute information 10*c* to deliver the contents individually to each of the selected terminal systems 30 by taking into account a season, a date, a day, locations of the terminal systems 30, etc. Further, the contents-delivery unit 204 can customize the contents with respect to each of the terminal systems 30 based on characteristics of the terminal systems 30 as such characteristics are specified in the terminal-attribute information 10*c*. Such a function is implemented as the light-load-time-period-remote-casting function. As a result, the remote-delivery function directed to delivery of high-definition moving pictures (i.e., the light-load-time-period-remote-casting function) can be achieved economically by using existing infrastructure, whereas such a function cannot be implemented in the related-art schemes which are based on either delivery of recording media or one-way delivery of contents.

The terminal-attribute information 10*c* of the present embodiment includes identification numbers of the terminal systems 30. In this case, as shown in the figures, when the contents-delivery unit 204 selects the advertisement-moving-picture contents based on the advertisement-contents-control information so as to deliver the contents to the terminal systems 30 based on the advertisement-delivery-schedule data 10*d* during the light-load time period, the terminal systems 30 are selected based on the identification-number information, and the delivery of the contents is performed automatically based on the advertisement-delivery-schedule data 10*d*. This is performed by the light-load-time-period-remote-casting function. In this manner, the operation conditions of the terminal systems 30 selected based on the identification-number information can be controlled from the center system 20 via a remote-control function. Based on this function, the operation conditions of the terminal systems 30 can be checked individually so as to provide diligent delivery control, remote diagnosis, and remote maintenance with respect to each of the terminal systems 30. This is implemented as the light-load-time-period-remote-casting function.

As shown in the figures, the terminal-attribute information 10*c* has a data structure which includes a field for specifying places where the terminal systems 30 are installed (e.g., railway stations, convenient stores, department stores, and the like). In this case, when the contents-delivery unit 204 selects the advertisement-moving-picture contents based on the advertisement-contents-control information so as to deliver the contents to the terminal systems 30 based on the advertisement-delivery-schedule data 10*d* during the light-load time period, the terminal systems 30 are selected based on the installed-place information, and the delivery of the contents is performed automatically based on the advertisement-delivery-schedule data 10*d*. This is performed by the light-load-time-period-remote-casting function. In this manner, the operation conditions of the terminal systems 30 selected based on the installed-place information can be controlled from the center system 20 via the remote-control function. Based on this function, the operation conditions of the terminal systems 30 can be checked individually so as to provide diligent delivery control, remote diagnosis, and remote maintenance with respect to each of the terminal systems 30. This is implemented as the light-load-time-period-remote-casting function.

The display-schedule setting unit 205, as shown in the figures, is provided with a function to set a schedule for displaying of advertisement-moving-picture contents so as to control the terminal systems 30 with regard to a displaying operation thereof. In this embodiment, this function is provided by the microcomputer inside the server PC. In this case when the contents-delivery unit 204 selects the advertisement-moving-picture contents based on the advertisement-contents-control information so as to deliver the contents to the terminal systems 30 during the light-load time period based on the advertisement-delivery-schedule data 10*d*, the contents-delivery unit 204 accesses the terminal systems 30 via the ISDN lines 11 based on the terminal-attribute information 10*c* of the terminal systems 30 (i.e., calls the DSUs of the terminal systems 30). Then, the contents-delivery unit 204 attends to light-load-time-period-delivery processing for sending the advertisement-moving-picture contents and the advertisement-display-schedule data 10*b* to the terminal systems 30 during the light-load-time period based on the advertisement-delivery-schedule data 10*d*. Further, since the function to control the advertisement-display-schedule data 10*b* is provided, a light-load-time-period-remote-casting function can give priority to contents of an urgent nature such as earthquake information, fire information, railway-accident information, etc., over any other contents. In detail, the advertisement-delivery-schedule data 10*d* that is already set and the advertisement-display-schedule data 10*b* that is already transmitted are referred to, so that the advertisement-delivery-schedule data 10*d* is updated to include appropriate contents. For example, when the advertisement-delivery-schedule data 10*d* needs to be set in a given one of the terminal systems 30, a check is made to find available time periods in the displaying schedules of the given one of the terminal systems 30, available time periods in the delivery schedule for delivering the moving-picture-advertisement-contents-MPEG2 data 10*a* to the given one of the terminal systems 30, and a light-load time period of the given one of the terminal systems 30. Based on this check, a decision is made to select appropriate time periods for delivering contents, and an estimate is obtained with regard to time lengths which would be required for such deliveries. In this manner, the contents are delivered during such a time period as to warrant the lowest fee and a reliable delivery.

The compression-and-coding unit 206, as shown in the figures, is provided with a function to generate the moving-picture-advertisement-contents-MPEG2 data 10*a* that is compressed and encoded. This unit is implemented by the microcomputer provided inside the server PC. In this case, when the contents-delivery unit 204 selects the advertisement-moving-picture contents based on the advertisement-contents-control information so as to deliver the contents to the terminal systems 30 based on the advertisement-delivery-schedule data 10*d* during the light-load time period, the delivery-terminal systems 30 are selected based on the identification-number information, and the compressed contents are automatically delivered to the selected terminal systems 30 based on the advertisement-delivery-schedule data 10*d* of the selected terminal systems 30. This is performed by the light-load-time-period-remote-casting function. The compressing-and-encoding function of the compression-and-coding unit 206 provides the following advantages. Namely, when moving-picture information or high-definition images having a large amount of multi-media data in the range of several hundreds mega-bytes is sent from the center system 20 to the terminal systems 30 after the contents-delivery unit 204 selects the terminal systems 30 based on the terminal-attribute information 10*c* for the purpose of delivering commercials on sales goods, notices from a local community, traffic information, a local weather forecast, or the like, the contents after compression thereof are delivered during a time period when the communication-line-usage fee is relatively inexpensive, the purpose being to avoid an increase in a communication-line-usage fee caused by use of the ISDN lines 11 during daytime for a long time period for delivering a large amount of the data. In this manner, the light-load-time-period-remote-casting function is implemented at a low cost so as to cope with the delivery of multi-media data such as moving pictures or high-definition images. In detail, 500-Mbit data comprised of moving pictures and high-definition images, which corresponds to one minute's worth of MPEG2 video contents, may be transmitted at a data rate of 64 kbs by use of the communication (ISDN) lines 11. In this case, the light-load-time-remote-casting function of the present invention can complete the data delivery within only one hour or two. As a result, it is possible to eliminate time and labor that would be spent on recording the contents in recording media such as magneto-optical memory media or magnetic disks at the site of the center system 20. Also, time and labor spent on the delivery of the recording media to the terminal systems 30 are eliminated. Further, there is no need to spend time and labor on loading the recording media to the reading devices of the terminal systems 30 so as to store the contents in the terminal systems 30. In this manner, a light-load-time-period-remote-casting function is implemented so as to eliminate a need for time and labor to be spent on recording of contents in memory media, delivery of the memory media, and reading of contents from the memory media.

As described above, the compression-and-coding unit 206 is provided with the function to generate the moving-picture-advertisement-contents-MPEG2 data 10*a* that is compressed and encoded. In this case, when the contents-delivery unit 204 selects the advertisement-moving-picture contents based on the advertisement-contents-control information so as to deliver the contents to the terminal systems 30 based on the advertisement-delivery-schedule data 10*d* during the light-load time period, the contents-delivery unit 204 accesses the terminal systems 30 via the ISDN lines 11 based on the terminal-attribute information 10*c* of the terminal systems 30 (i.e., calls the DSUs of the terminal systems 30), and attends to automatic light-load-time-period-delivery processing for sending the advertisement-moving-picture contents and the advertisement-display-schedule data 10*b* to the terminal systems 30 during the light-load-time period according to the advertisement-delivery-schedule data 10*d* of the terminal systems 30. This is performed by the light-load-time-period-remote-casting function. The compressing-and-encoding function of the compression-and-coding unit 206 and the light-load-time-period-delivery-scheduling process based on the delivery-schedule setting unit 203 provide the following advantages. Namely, when moving-picture information or high-definition images having a large amount of multi-media data in the range of several hundreds mega-bytes is sent from the center system 20 to the terminal systems 30 after the contents-delivery unit 204 selects the terminal systems 30 based on the terminal-attribute information 10*c* to deliver the contents according to the advertisement-delivery-schedule data 10*d* generated by the delivery-schedule setting unit 203 for the purpose of delivering commercials on sales goods, notices from a local community, traffic information, a local weather forecast, or the like, the contents after compression thereof are delivered during a time period when the communication-line-usage fee is relatively inexpensive, the purpose being to avoid an increase in a communication-line-usage fee caused by use of the ISDN lines 11 during daytime for a long time period for delivering a large amount of the data. In this manner, the light-load-time-period-remote-casting function is implemented at a low cost so as to cope with the delivery of multi-media data such as moving pictures or high-definition images. In detail, 500-Mbit data comprised of moving pictures and high-definition images, which corresponds to one minute's worth of MPEG2 video contents when displayed on the display unit 302 such as a large-scale plasma display or the aurora vision, may be transmitted at a data rate of 64 kbs by use of the communication (ISDN) lines 11. In this case, the light-load-time-remote-casting function of the present invention can complete the data delivery within only one hour or two. As a result, it is possible to eliminate time and labor that would be spent on recording the contents in recording media such as magneto-optical memory media or magnetic disks at the site of the center system 20. Also, time and labor spent on the delivery of the recording media to the terminal systems 30 are eliminated. Further, there is no need to spend time and labor on loading the recording media to the reading devices of the terminal systems 30 so as to store the contents in the terminal systems 30. In this manner, a light-load-time-period-remote-casting function is implemented so as to eliminate a need for time and labor to be spent on recording of contents in memory media, delivery of the memory media, and reading of contents from the memory media. Namely, the remote-delivery function directed to delivery of high-definition moving pictures (i.e., the light-load-time-period-remote-casting function) can be achieved economically by using existing infrastructure, whereas such a function cannot be implemented in the related-art schemes which are based on either delivery of recording media or one-way delivery of contents.

The center system 20 further includes a still-image receiving unit 207, a still-image storing unit 208, a still-image decompressing unit 209, and a display unit 210. These units are provided in order to achieve a remote monitoring function to check whether the moving-picture-advertisement-contents-MPEG2 data 10a is displayed as expected on the display unit 302 of the terminal systems 30.

The still-image receiving unit 207 has a function to receive compressed-still-image data sent from a still-image-transmission unit 314 via the communication lines 11. The still-image receiving unit 207 is implemented by the microprocessor of the server PC.

The still-image storing unit 208 serves a function to store the compressed-still-image data received by the still-image receiving unit 207, and is implemented through a RAM inside the server PC. The still-image decompressing unit 209 is provided with a function to read the compressed-still-image data from the still-image storing unit 208 at constant intervals and to decode and decompress the data. This function is provided by the microcomputer of the server PC. The display unit 210 displays the still-image data on a remote-monitoring screen with respect to each of the terminal systems 30, and is implemented by a CRT of the server PC.

The remote-monitoring function is achieved as follows. When the terminal-control unit sends the still-image data to the display unit 210 at constant intervals and the still-image decompressing unit 209 is instructed to decompress the still-image data, a plurality of still images are simultaneously displayed on the remote-monitoring screen so as to include the most recent still image and immediately preceding still images obtained within a predetermined time period. As a new still image is added to the set of displayed images, the oldest still image is removed from the display since this image was obtained more than a predetermined time period before the newest still image. Such display control is provided by a multi-window-display function. In this manner, contents of an urgent nature such as earthquake information, fire information, railway-accident information, etc., can be given priority over other contents in terms of an order of display in which contents are displayed on the display unit 302 such as a large-scale plasma display or an aurora vision. This is achieved as part of the light-load-time-period-remote-casting function. As a result, the function of displaying emergency information and the function of displaying advertisement can be accommodated together to serve their respective purposes whereas such a coexistence is not possible in the related-art schemes which are based on either delivery of recording media or one-way delivery of contents.

As shown in the figure, the center system 20 further includes a character-information receiving unit 211, an identification unit 212, a terminal-selection unit 213, and a transmission unit 214 in order to implement a security-control function. As shown in the figures, the character-information receiving unit 211 receives the character information 10e, identification data 10f, and selection data from the ISDN lines 11. This unit is implemented via the microcomputer of the server PC, a DSU, and a TA. The identification unit 212 identify the terminal systems 30 and users based on the received identification data 10f, and is implemented via the microcomputer of the server PC. The terminal-selection unit 213 has a function to select the terminal systems 30 based on the received selection data so that the character information 10e is sent to the selected terminal systems 30. This unit is also implemented via the microcomputer of the server PC.

The transmission unit 214 serves a function to transmit the received character information 10e to the selected terminal systems 30 only when valid identifications are obtained. The microcomputer of the server PC, the DSU, and the TA together provide the function of this unit. Because of all of this, authorized users using authorized terminal systems 30 can display the character information 10e on the display unit 302 such as a large-scale plasma display or an aurora vision, or can select the terminal systems 30 so as to make the character information 10e displayed on the display unit 302 of the selected terminal systems 30.

Since the character information 10e includes only a limited amount of data, transmission of such information via the ISDN lines 11 can be completed in a short time period, so that use of the character information 10e is suitable when emergency information requiring a realtime response needs to be displayed. In such a case, specific information of an urgent nature can be displayed on a selected set of terminal systems 30 located in a selected area. Further, the contents-delivery unit 204 can be provided with a remote-control function to control the operations of the terminal systems 30 selected based on the terminal-attribute information 10c. Moreover, the contents-delivery unit 204 can be provided with a function to check the operation conditions of the terminal systems 30 selected based on the terminal-attribute information 10c and to provide diligent delivery control, remote diagnosis, and remote maintenance.

The identification function as described above can be combined with the emergency-responding function which gives priority to contents of an urgent nature such as earthquake information, fire information, railway-accident information, etc., over any other routine contents. Such a combination can enhance reliability of the information by allowing a check to be made on the identity of the information source. This helps to avoid such a situation in which erroneous emergency information or fake emergency information are distributed, thereby providing a tight-security delivery function.

The center system 20 further includes a memory unit 215 into which a memory medium is inserted. The center system 20 is provided with a media-interface function to record moving-picture-advertisement-contents-MPEG2 data 10a in the memory medium of the memory unit 215. The memory unit 215 may be a removable-disk drive. When the moving-picture-advertisement-contents-MPEG2 data 10a is recorded in the removable memory medium inserted into the memory unit 215, the memory medium can be used for installing the contents in a terminal system 30 when the system is newly installed. This removes a need for transmitting the contents. Further, the memory unit 215 can be used as a substitute for a hard drive of the center system 20 when the hard drive suffers malfunction.

As described above, even when moving-picture information or high-definition images having a large amount of multi-media data in the range of several hundreds megabytes is sent from the center system 20 to the terminal systems 30 for the purpose of delivering commercials on sales goods, notices from a local community, traffic information, a local weather forecast, or the like, the center system 20 according to the present embodiment can deliver the contents during a time period when the communication-line-usage fee is relatively inexpensive, the purpose being to avoid an increase in a communication-line-usage fee caused by use of the communication lines during a daytime for a long time period for delivering a large amount of the data. In this manner, the light-load-time-period-remote-casting function is implemented at a low cost so as to cope with the delivery of multi-media data such as moving pictures or high-definition images. Further, even when moving-picture information or high-definition images having a large amount of multi-media data in the range of several hundreds megabytes is sent from the center system 20 to the terminal systems 30 for the purpose of delivering commercials on sales goods, notices from a local community, traffic information, a local weather forecast, or the like, the contents are delivered during a time period when the terminal systems 30 are idling, the purpose being not to require the terminal systems 30 to have a high-performance capacity and not to require the communication lines to have a high-speed-data-transfer capacity so as to avoid a cost increase associated with enhancement of the terminal systems 30 and to avoid an increase in a communication-line-usage fee caused by use of a high-speed-data-transfer network. In this manner, the light-load-time-period-remote-casting function is implemented at a low cost so as to cope with delivery of multi-media data such as moving pictures or high-definition video images. Moreover, based on the function to control the advertisement-delivery-schedule data 10*d*, the contents-delivery unit 204 uses the terminal-attribute information 10*c* to deliver the contents individually to each of the selected terminal systems 30 by taking into account a season, a date, a day, locations of the terminal systems 30, etc. Further, the contents-delivery unit 204 can customize the contents with respect to each of the terminal systems 30 based on characteristics of the terminal systems 30 as such characteristics are specified in the terminal-attribute information 10*c*. Such a function is implemented as the light-load-time-period-remote-casting function. As a result, it is possible to eliminate time and labor that would be spent on recording the contents in recording media such as magneto-optical memory media or magnetic disks at the site of the center system 20. Also, time and labor spent on the delivery of the recording media to the terminal systems 30 are eliminated. Further, there is no need to spend time and labor on loading the recording media to the reading devices of the terminal systems 30 so as to store the contents in the terminal systems 30. In this manner, the light-load-time-period-remote-casting function is implemented so as to eliminate a need for time and labor to be spent on recording of contents in memory media, delivery of the memory media, and reading of contents from the memory media. Namely, the remote-delivery function directed to delivery of high-definition moving pictures (i.e., the light-load-time-period-remote-casting function) can be achieved economically by using existing infrastructure, whereas such a function cannot be implemented in the related-art schemes which are based on either delivery of recording media or one-way delivery of contents.

The terminal systems 30 are installed at railway stations, convenient stores, and the like, and is equipped with a function to display the moving-picture-advertisement-contents-MPEG2 data 10*a* on the display unit 302. Each of the terminal systems 30 includes a receiving unit 301, the display unit 302, a terminal-control unit 303, and a decompression unit 304, and is implemented via a client personal computer (PC). The receiving unit 301 serves a function to receive the moving-picture-advertisement-contents-MPEG2 data 10*a* and/or the advertisement-display-schedule data 10*b* sent via the ISDN lines 11. This function is implemented via a microcomputer provided inside the client PC. The display unit 302 includes a display 3021 for displaying the moving-picture-advertisement-contents-MPEG2 data 10*a* which is received by the receiving unit 301. In the present embodiment, a large-scale plasma display, an aurora vision, or the like is used as the display 3021. In the following, the display 3021 is referred to as a large-scale plasma display 3021. The terminal-control unit 303 controls an operation for displaying the moving-picture-advertisement-contents-MPEG2 data 10*a* on the display unit 302 based on the advertisement-display-schedule data 10*b*. This function is also implemented via the microcomputer provided inside the client PC. When the contents-delivery unit 204 is provided with a function to combine the moving-picture-advertisement-contents-MPEG2 data 10*a* and the advertisement-display-schedule data 10*b* into a single data structure for the purpose of delivery thereof, the terminal-control unit 303 separates the advertisement-display-schedule data 10*b* from the moving-picture-advertisement-contents-MPEG2 data 10*a*.

The decompression unit 304 serves to decode and decompress the moving-picture-advertisement-contents-MPEG2 data 10*a* that is received in an encoded and compressed form. This function is implemented via the microcomputer provided inside the client PC. The decompression unit 304 decodes and decompresses the moving-picture-advertisement-contents-MPEG2 data 10*a* when the receiving unit 301 receives the compressed moving-picture-advertisement-contents-MPEG2 data 10*a* via the ISDN lines 11. In response, the terminal-control unit 303 controls the operation for displaying the moving-picture-advertisement-contents-MPEG2 data 10*a* on the large-scale plasma display 3021 according to the advertisement-display-schedule data 10*b*. Because of such a decompression mechanism, it is possible to receive in a compressed form the moving-picture information or high-definition images having a large amount of multi-media data in the range of several hundreds megabytes when the contents-delivery unit 204 of the center system 20 needs to send commercials on sales goods, notices from a local community, traffic information, a local weather forecast, or the like. Also, the advertisement-moving picture contents are delivered during a time period when the communication-line-usage fee is relatively inexpensive, avoiding a daytime during which use of the ISDN lines 11 for a long time period would lead to an increase in the communication-line-usage fee. In this manner, a low-cost solution is provided to cope with delivery of multi-media data such as moving pictures or high-definition images. Namely, the remote-delivery function directed to delivery of high-definition moving pictures (i.e., the light-load-time-period-remote-casting function) can be achieved economically by using existing infrastructure, whereas such a function cannot be implemented in the related-art schemes which are based on either delivery of recording media or one-way delivery of contents.

Each of the terminal systems 30 further includes a remote-monitoring-purpose monitor camera 305, a still-image-compression/encoding unit 306, a still-image storing unit 307, a selection-data transmission unit 311, and a still-image-transmission unit 314. These units are provided for the purpose of implementing a remote-monitoring function which is used for monitoring whether the moving-picture-advertisement-contents-MPEG2 data 10*a* sent from the center system 20 is displayed as expected on the large-scale plasma display 3021. The remote-monitoring-purpose monitor camera 305 takes a picture of what is displayed on the large-scale plasma display 3021, thereby generating still-image data. The remote-monitoring-purpose monitor camera 305 may be implemented by a CCD camera connected to the client PC. The still-image-compression/encoding unit 306 applies a compression/encoding process to the still-image data to generate compressed-still-image data. This unit is implemented via the microcomputer of the client PC. The still-image storing unit 307 stores the compressed-still-image data, and a RAM inside the client PC is used for this purpose. The still-image-transmission unit 314 serves a function to send the compressed-still-image data stored in the still-image storing unit 307 to the center system 20. This function is implemented via the microcomputer of the client PC, a DSU, and a TA. In this manner, the remote-monitoring function is implemented so as to allow the center system 20 to monitor the operation conditions of the terminal systems 30 which are selected by the contents-delivery unit 204 based on the terminal-attribute information 10c. Namely, a check can be made as to whether the delivered contents are displayed as expected on the large-scale plasma display 3021 of the terminal systems 30 which are selected by the contents-delivery unit 204 based on the terminal-attribute information 10c. This is implemented as part of the light-load-time-period-remote-casting function. In this manner, it is possible to check what is shown on the large-scale plasma display 3021 by sampling pictures at constant intervals to provide a set of still pictures obtained during a predetermined time period prior to a present moment. There is no need to check the remote-monitoring monitor of the center system 20 all the time in order to see if the contents are displayed as expected on the large-scale plasma display 3021 of the terminal systems 30. Further, transmission of the compressed-still-image data can achieve more economic use of the ISDN lines 11 compared to transmission of moving pictures for the remote-monitoring purpose. These functions are economically achieved by using existing infrastructure, whereas such functions cannot be implemented in the related-art schemes which are based on either delivery of recording media or one-way delivery of contents.

The terminal systems 30 and the center system 20 can implement a superimposing function to display both the character information 10e and the moving-picture-advertisement-contents-MPEG2 data 10a on the large-scale plasma display 3021. To this end, each of the terminal systems 30 further includes a character-information-transmission unit 308, a identification-transmission unit 309, and a terminal-system selecting unit 310. As shown in the figures, the character-information-transmission unit 308 serves to generate and transmit the character information 10e, and is implemented by the microcomputer of the client PC, the DSU, and the TA. As shown in the figures, the identification-transmission unit 309 serves a function to transmit the identification data 10f of the terminal and the identification data 10f of the user, and the microprocessor of the client PC, the DSU, and the TA are used for this purpose. The terminal-system selecting unit 310 as shown in the figures is provided with a function to generate selection data for selecting the terminal systems 30 with an aim of having the character information 10e displayed on the large-scale plasma display 3021 of the selected terminal systems 30. This function is implemented by the microprocessor of the client PC. The selection-data transmission unit 311 serves to transmit the selection data, and is implemented by the microprocessor of the client PC, the DSU, and the TA. In this manner, authorized users using authorized terminal systems 30 can make the character information 10e displayed on the large-scale plasma display 3021, or can select the terminal systems 30 for making the selected terminal systems 30 display the character information 10e on the display unit 302 thereof.

Since the character information 10e includes only a limited amount of data, transmission of such information via the ISDN lines 11 can be completed in a short time period, so that use of the character information 10e is suitable when emergency information requiring a realtime response needs to be displayed. In such a case, specific information of an urgent nature can be displayed on a selected set of terminal systems 30 located in a selected area. Further, the contents-delivery unit 204 can be provided with the remote-control function to control the operations of the terminal systems 30 selected based on the terminal-attribute information 10c. Moreover, the contents-delivery unit 204 can be provided with the function to check the operation conditions of the terminal systems 30 selected based on the terminal-attribute information 10c and to provide diligent delivery control, remote diagnosis, and remote maintenance. The identification function for identifying users can be combined with the emergency-responding function which gives priority to contents of an urgent nature such as earthquake information, fire information, railway-accident information, etc., over other routine contents. Such a combination can enhance reliability of the information by allowing a check to be made on the identity of the information source. This helps to avoid such a situation in which erroneous emergency information or fake emergency information are distributed, thereby providing a tight-security delivery function.

Each of the terminal system 30 further includes a memory unit 312 into which a memory medium is inserted. Each of the terminal systems 30 is provided with a media-interface function to read moving-picture-advertisement-contents-MPEG2 data 10a from the memory medium of the memory unit 312. The memory unit 312 may be a removable-disk drive. When the removable memory medium recording therein the moving-picture-advertisement-contents-MPEG2 data 10a is provided, the memory medium can be used for installing the contents in a terminal system 30 when the system is newly installed. This removes a need for transmitting the contents via the communication lines. Further, the memory unit 312 can be used as a substitute for a hard drive of the terminal systems 30 when the hard drive suffers malfunction.

As described above, even when moving-picture information or high-definition images having a large amount of multi-media data in the range of several hundreds megabytes is sent from the center system 20 to the terminal systems 30 selected by the contents-delivery unit 204 based on the terminal-attribute information 10c for the purpose of delivering commercials on sales goods, notices from a local community, traffic information, a local weather forecast, or the like, the terminal systems 30 according to the present embodiment can receive the contents during a time period when the communication-line-usage fee is relatively inexpensive, the purpose being to avoid an increase in a communication-line-usage fee caused by use of the communication lines during a daytime for a long time period for delivering a large amount of the data. In this manner, a low-cost solution is provided to cope with the delivery of multi-media data such as moving pictures or high-definition images. Once the center system 20 determines and sends a display schedule, there is no need for center system 20 to control the display sequence of the terminal systems 30 at every turn. This results in the load on the center system 20 regarding display control being reduced, so that a single center system can attend to control a large number of terminal systems 30.

In the following, detailed specifications of the multi-media-automatic-delivery system 10 as described above will be described according to the present embodiment.

[1] Features of Multi-Media-Automatic-Delivery System 10

Figure 5:
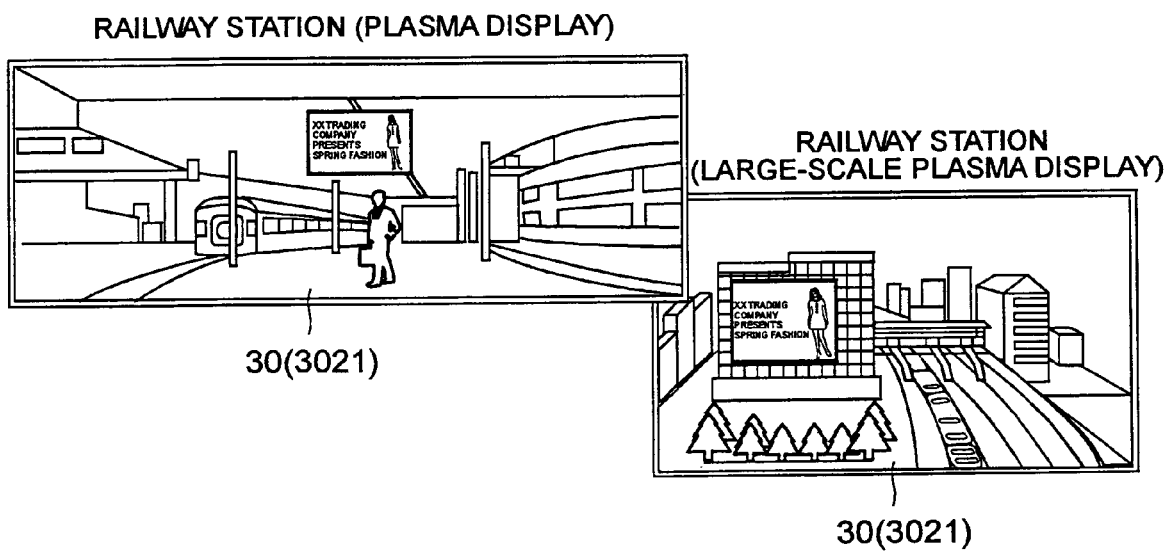
FIG. 5 is an illustrative drawing of the first embodiment of the multi-media-automatic-delivery system.

Features of the multi-media-automatic-delivery system 10 will be described in the following (see FIGS. 4 and 5).

1. High-Image Quality and Low Cost

Contents data is video images comparable to those of the DVD system. The 6-Mbps-advertisement-contents data 10a in compliance with the MPEG2 scheme can be used.

Straightforward transmission of the contents would require communication lines having a large capacity with respect to each of the terminal systems 30. In consideration of this, file transfer is used for the transmission of the contents.

Without adhering to a realtime display operation, contents are delivered during a nighttime when displaying thereof is not necessary. Schedule-control software is used to achieve customized contents display for each of the terminal systems 30.

2. Remote-Monitoring Function

Each of the terminal systems 30 is equipped with a small camera (remote-monitoring-purpose monitor camera 305). The display is monitored at all times, and a still image of the display is transmitted to the center system 20 once in several minutes to several tens of minutes.

The center system 20 displays a thumbnail of the still pictures with respect to each terminal system or with respect to each group of terminal systems, thereby providing a monitoring function.

3. Registration of Contents Transmission and Individual Control of the Display-Schedule Data 10b for Each of Terminal Systems 30

A check can be made as to what time period is available for a given terminal system 30, and a setting of a display schedule can be made with respect to each moving-picture-advertisement-contents-MPEG2 data 10a.

[3] Usage of the System a. Places of Installation of Terminal Systems 30 (Specified in the Terminal-Attribute Information 10c): Railway Stations, Underground Malls, Convenient Stores, Gasoline Stations, Etc.

In what follows, a first embodiment of the multi-media-automatic-delivery system 10 will be described.

First Embodiment

Figure 6:
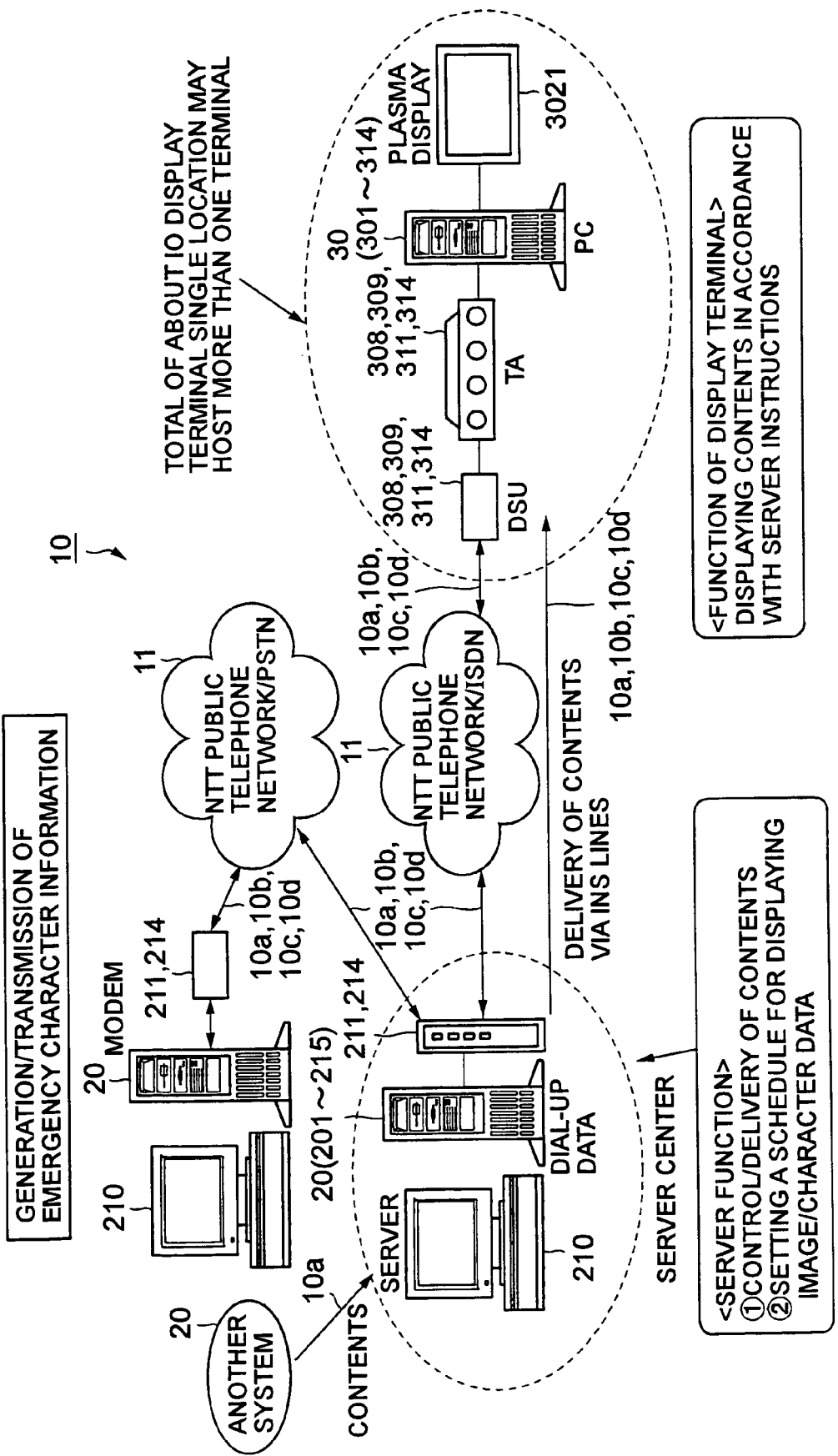
FIG. 6 is an illustrative drawing of the first embodiment of the multi-media-automatic-delivery system.

[4] Center System 20 (Server PC) (see FIGS. 1 and 6)

[4-1] Outline (see FIGS. 1 and 6)

This embodiment is applied to the server system of the multi-media-automatic-delivery system 10 directed to delivery of contents via a network.

[4-1-1] Outline of Functions of the Multi-Media-Automatic-Delivery System 10

(4-1-1-1) Delivery of Advertisement-Contents Data 10a to Terminal Systems 30 via Communication Lines 11 and Automatic Display Function of Terminal Systems 30

The advertisement-contents data 10a is transmitted from the server PC 20 via ISDN lines (64 or 128 Kbps) by taking several times to several tens of times as long as a display time.

The terminal systems 30 accumulate the advertisement-contents data 10a, and display it according to a specified schedule.

(4-1-1-2) Function to Display Character Information 10e at Time of Emergency

The character information 10e is delivered and displayed on the terminal systems 30 so as to present information of an urgent nature at the time of emergency such as earthquake as well as to present routine information such as a weather forecast.

[4-1-2] Communication Line 11: ISDN Lines 11 (64 Kbit/Sec or 128 Kbit/Sec)

[4-1-3] Displayed Contents: Moving Pictures, Still Images, and a Combination Thereof (Contents Data 10a)

[4-1-4] Types of Advertisement-Contents Data 10a

[4-1-4-1] Moving Pictures
  a. MPEG2 data in the range of 6 Mbps is used.
  b. It takes one to three minutes to display one set of the advertisement-contents data 10a.
  c. The number of contents stored in one terminal system 30 is limited to 20 to 50.

[4-1-4-2] Still Images
  a. JPEG data with a resolution equivalent to a VGA level
  b. No limit to a time period during which the images are displayed (i.e., the images may be displayed for only a short period of time or for 24 hours)

[4-1-5] Character Message 10e at Time of Emergency

[4-1-5-1] 5 to 30 characters per message

[4-1-5-2] There are two cases, i.e., the first case in which the character information 10e is superimposed on the advertisement-contents data 10a and the second case in which the display of the advertisement-contents data 10a is suspended so as to present the character information 10e over the entire screen of the large-scale plasma display 3021.

[4-1-5-3] The character information 10e requires realtime handling thereof to a certain extent (i.e., needs to be displayed a few seconds to a few minutes after the delivery thereof).

[4-1-6] Features of Multi-Media-Automatic-Delivery System 10

[4-1-6-1] The terminal systems 30 is provided with a function to display contents according to a specified schedule.

[4-1-6-2] Operation costs are low. Since the moving-picture-contents data 10a can be transmitted by taking time during a light-load time period such as a nighttime, there is no need to use communication lines 11 that offer a high-speed and large capacity at a high cost.

[4-1-7] Others

[4-2] Classification of Functions of Server PC (see FIG. 1)
  Function to register the advertisement-contents data 10a (enter/delete/change)
  Function to search for and display the advertisement-contents data 10a

[4-2-2] Contents-Control Function
  Function to register the terminal-attribute information 10c (enter/delete/change)
  Function to search for and display the terminal-attribute information 10c

[4-2-3] Terminal-System-Control Function
  Function to switch on/off the display unit
  Function to establish connection with the terminal systems 30.

[4-2-4] Display-Schedule-Control Function
  Function to make settings (input/delete/change)
  Function to make a search and display

[4-2-5] Function to Control Advertisement-Delivery-Schedule Data 10d
  Function to make settings (input/delete/change)
  Function to make a search and display

[4-2-6] Data-Delivery Function
  Function to deliver the advertisement-contents data 10a

[4-2-7] Maintenance Function of Multi-Media-Automatic-Delivery System 10
  Maintenance of server PC 20
  Maintenance of terminal systems 30 regarding a display function thereof.
  Maintenance of terminal systems 30 regarding a function to deliver character information 10e

[4-2-8] Security-Control Function
  Function to prevent unauthorized users from entering or tampering with the system

Figure 7:
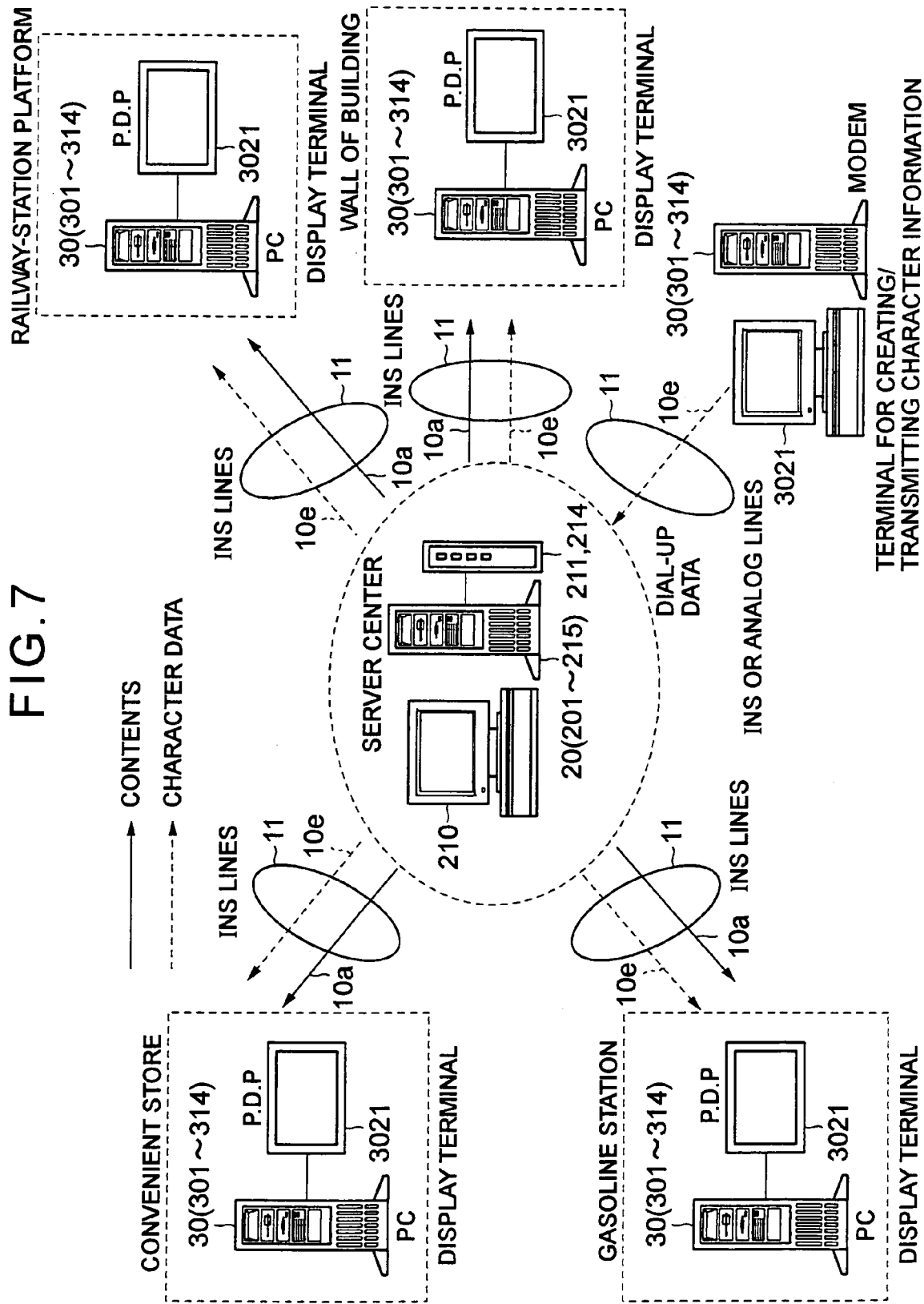
FIG. 7 is an illustrative drawing showing a configuration for delivering advertisement-contents data in the multi-media-automatic-delivery system of FIG. 6.
Figure 8:
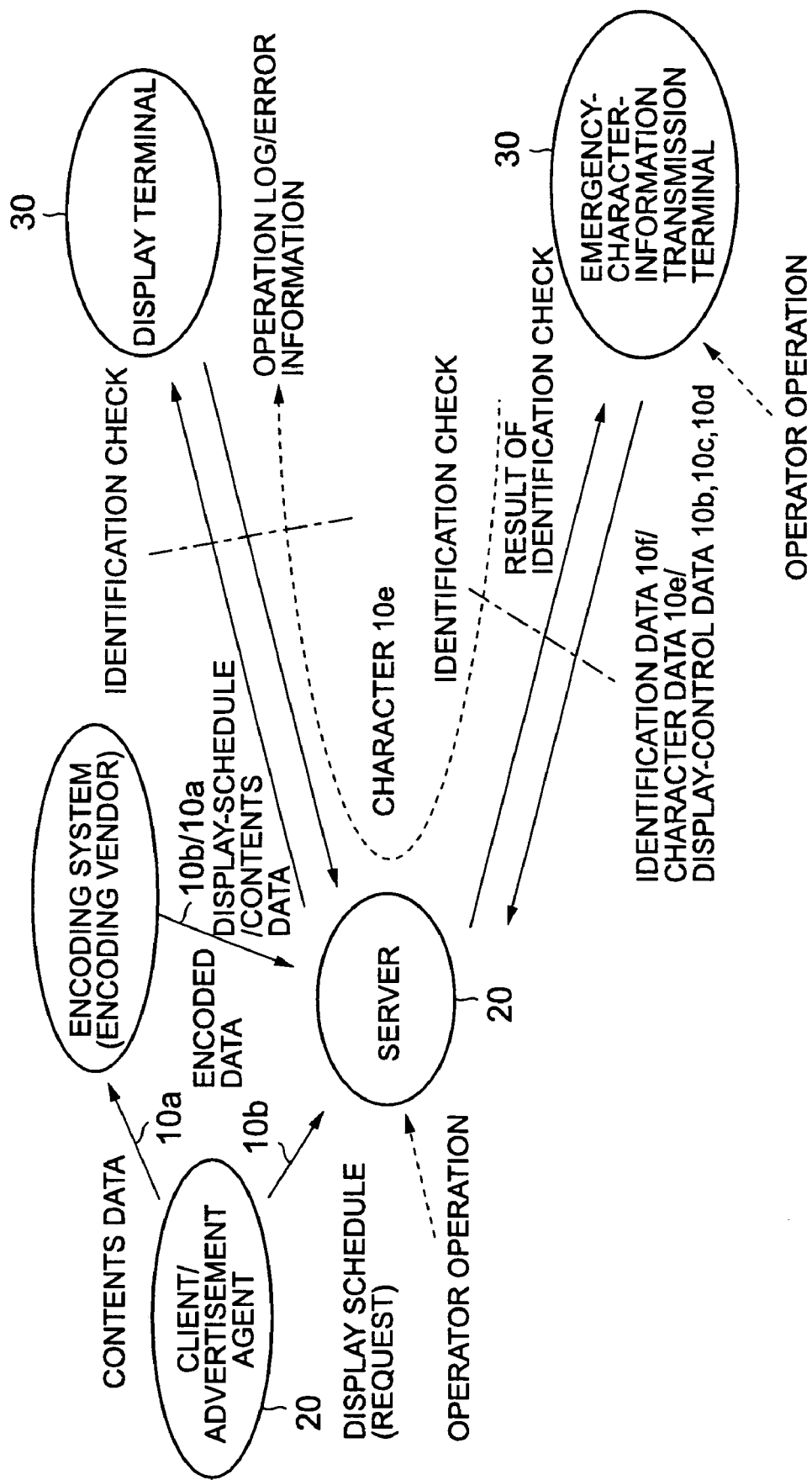
FIG. 8 is an illustrative drawing showing data flows associated with various functions of the PC server.
Figure 9:
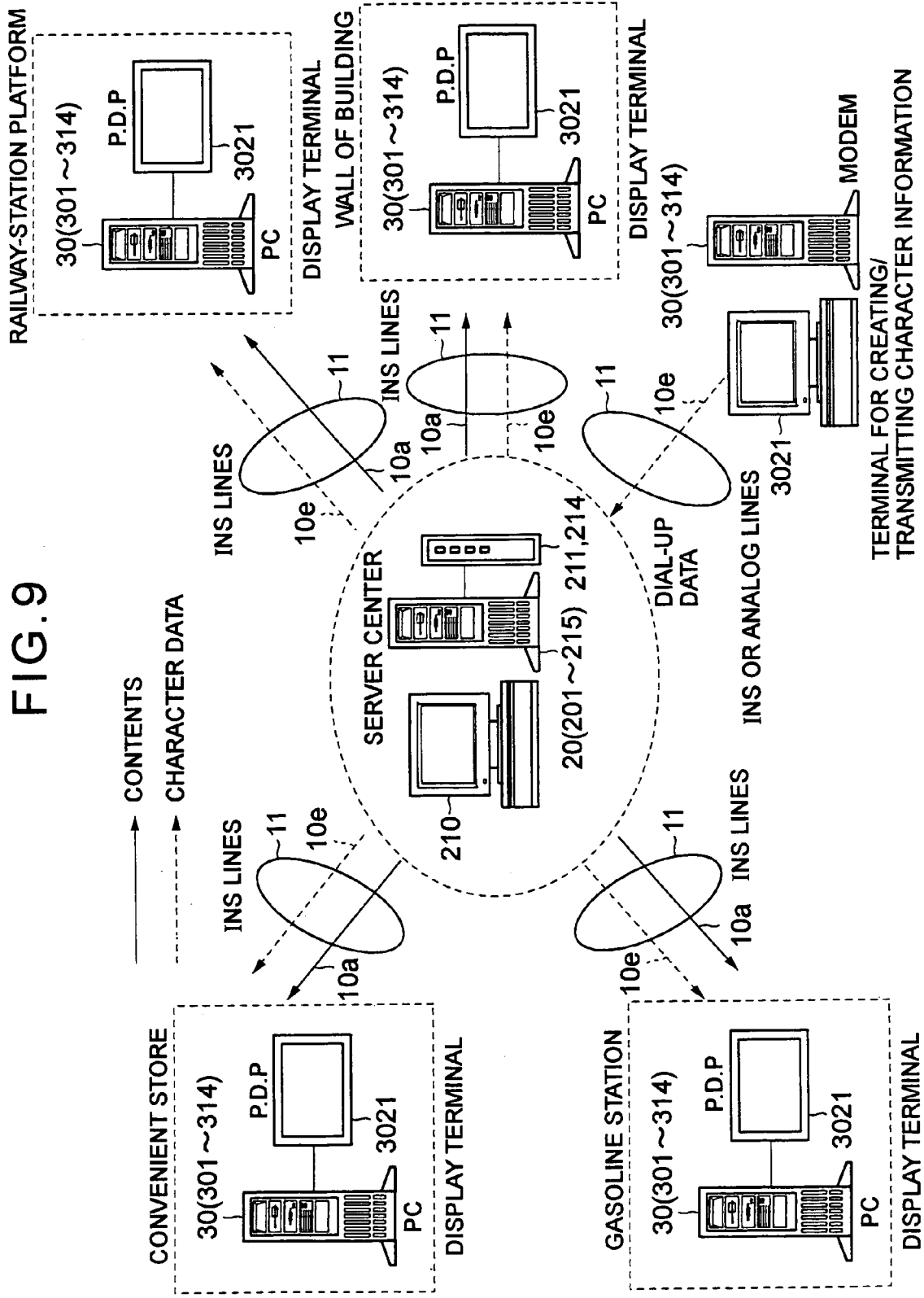
FIG. 9 is an illustrative drawing showing a configuration for delivering advertisement-contents data in the multi-media-automatic-delivery system of FIG. 6.
Figure 10:
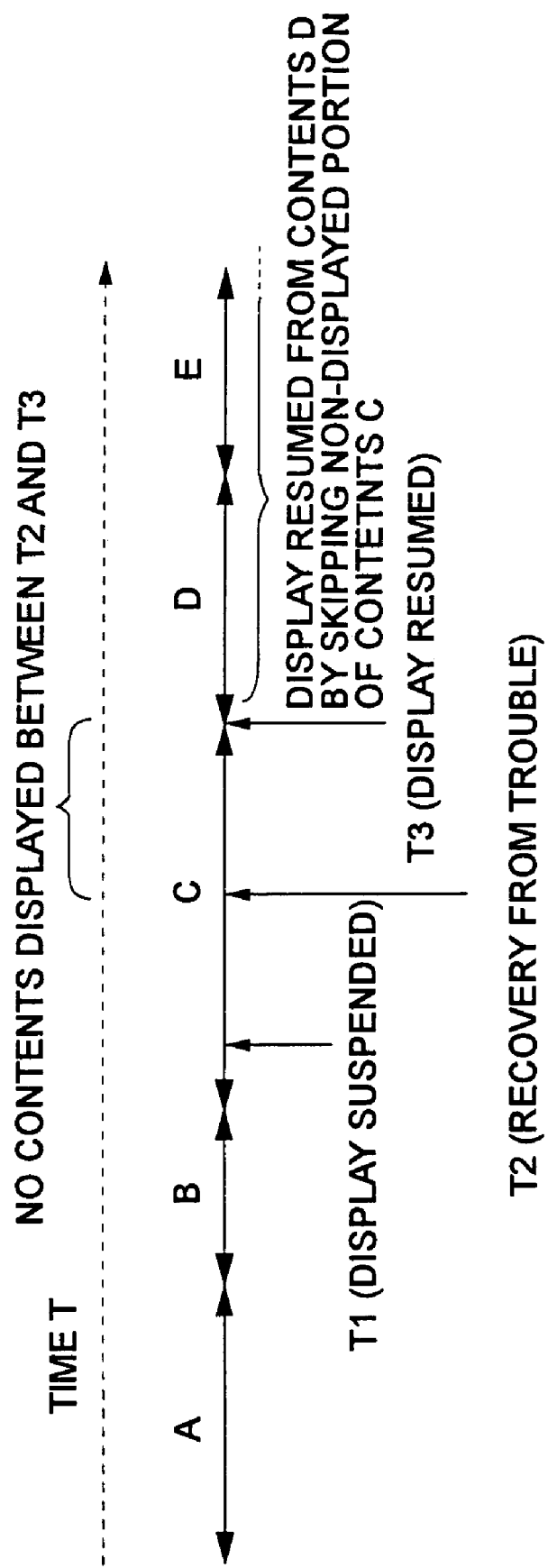
FIG. 10 is an illustrative drawing showing a display sequence when the sequence is suspended due to a trouble such as a power failure.
Figure 11:
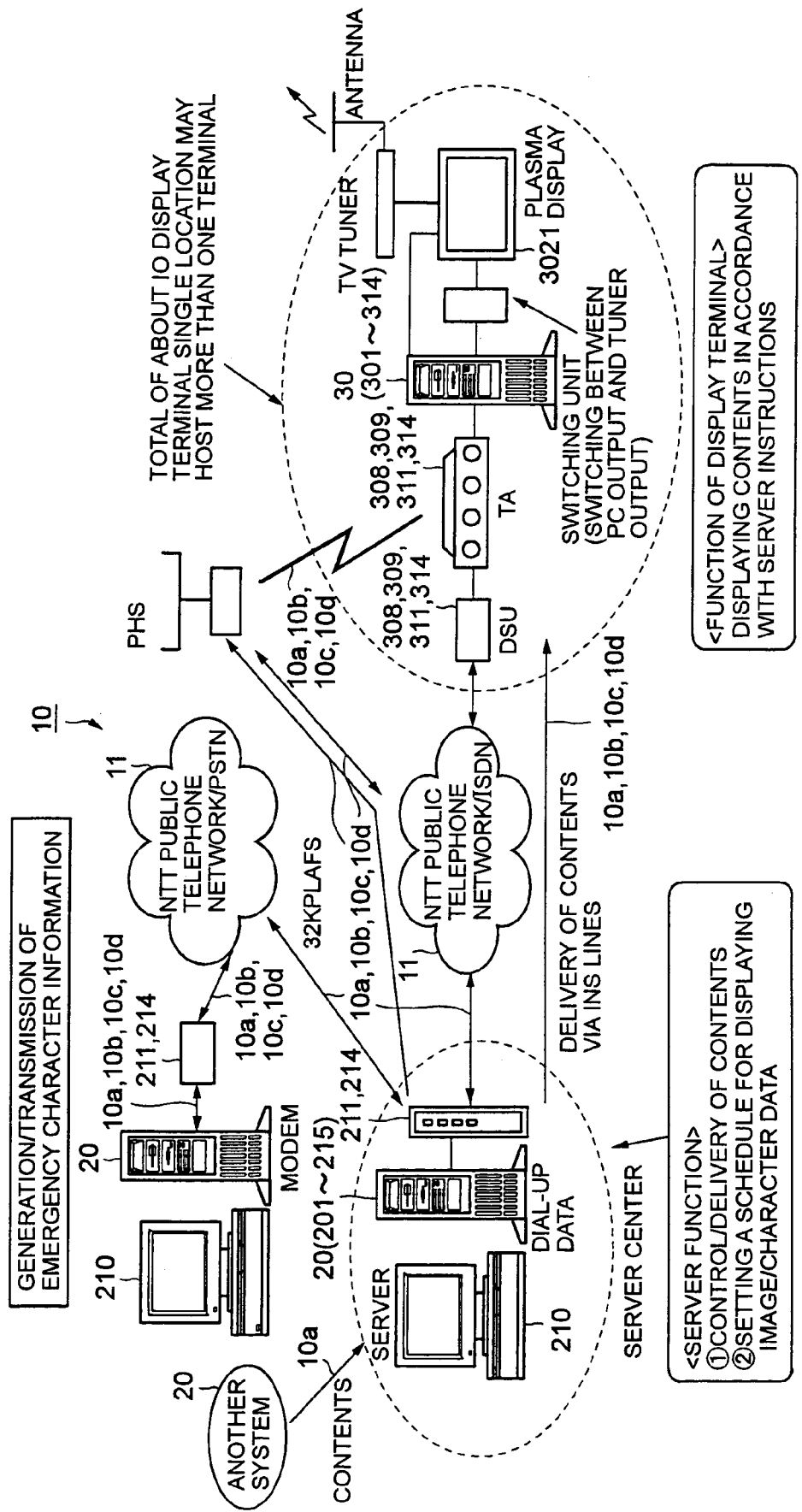
FIG. 11 is an illustrative drawing of a second embodiment of the multi-media-automatic-delivery system.
Figure 12:
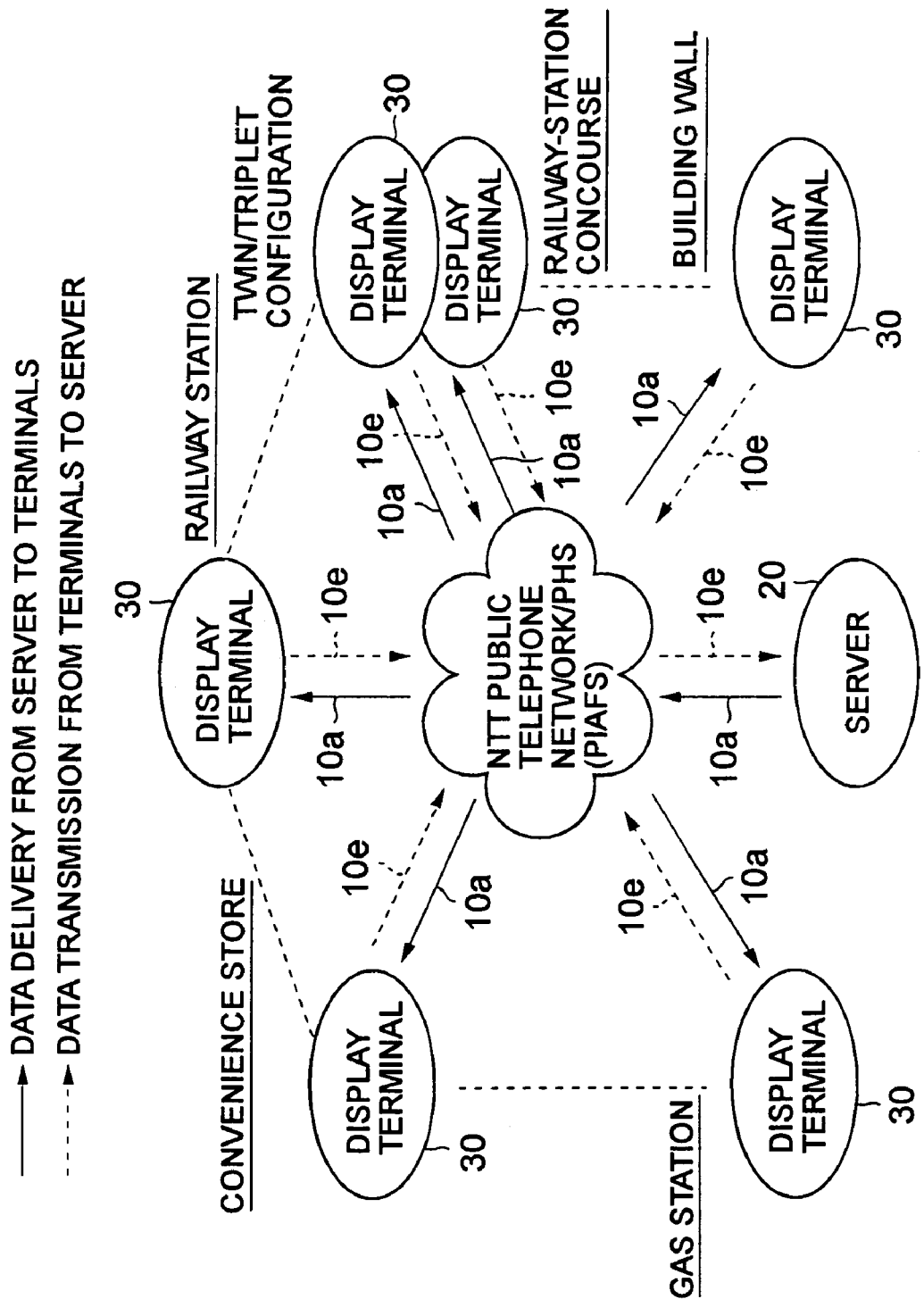
FIG. 12 is an illustrative drawing showing data flows of contents data in the multi-media-automatic-delivery system of FIG. 11.
Figure 13:
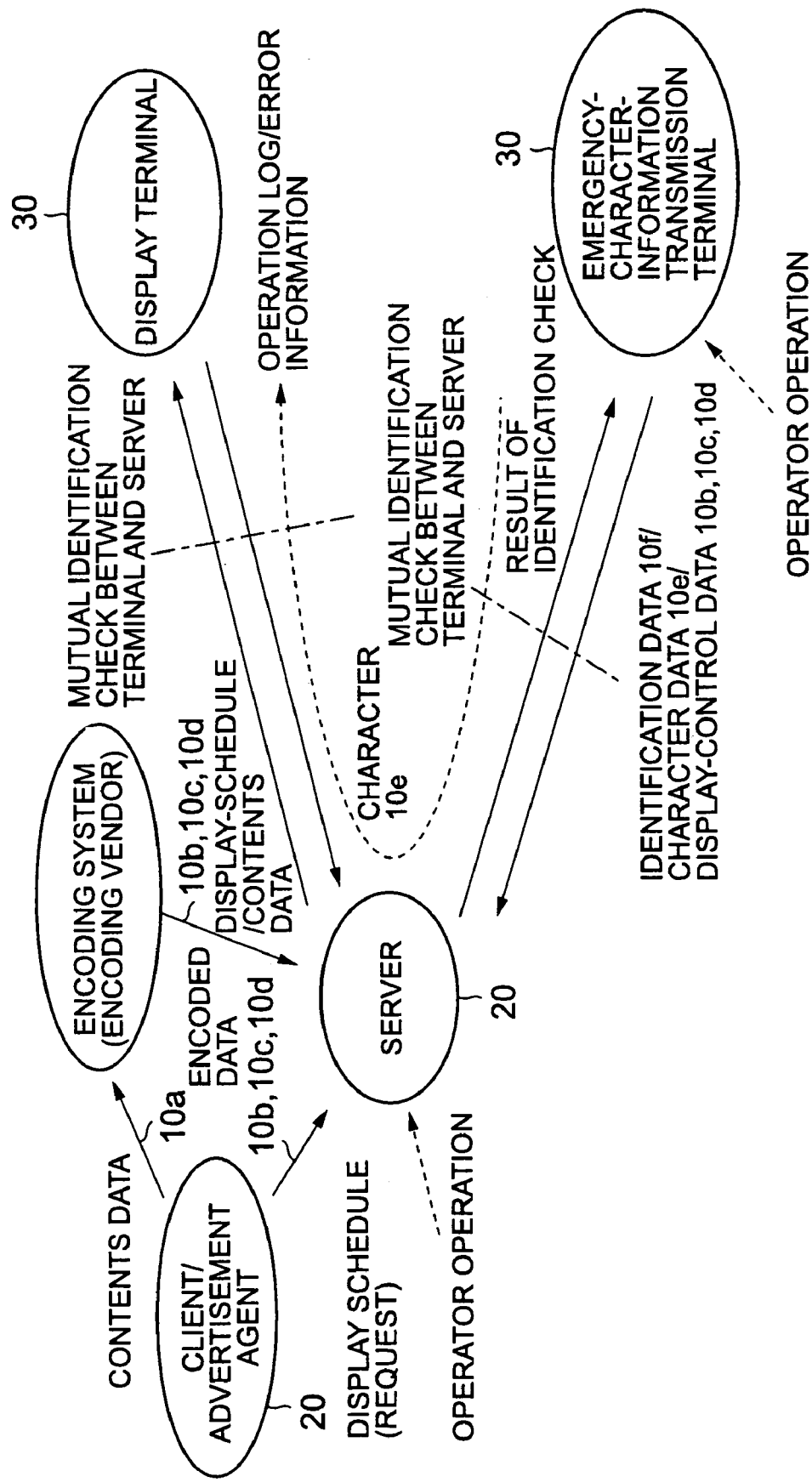
FIG. 13 is an illustrative drawing showing data flows associated with various functions of a PC server of the multi-media-automatic-delivery system of FIG. 11.
Figure 14:
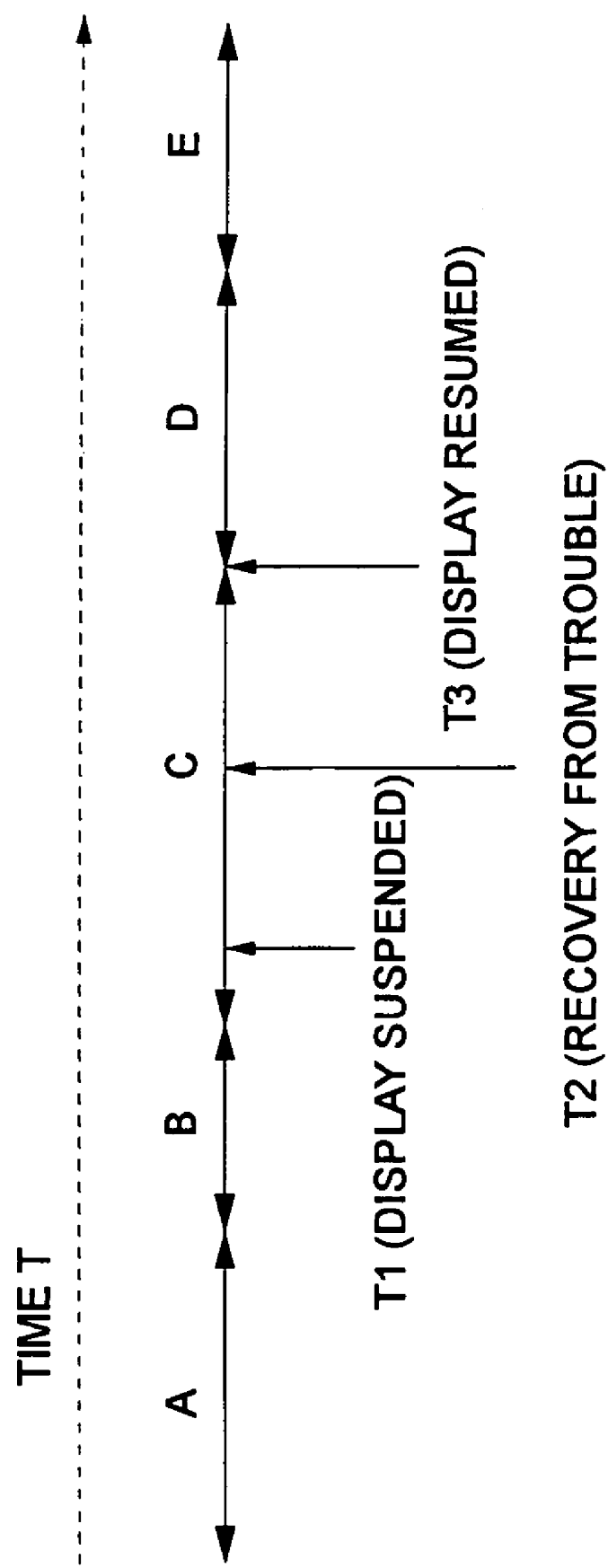
FIG. 14 is an illustrative drawing showing a display sequence when the sequence is suspended due to a trouble such as a power failure in the multi-media-automatic-delivery system of FIG. 11.

[4-2-9] Function to Control Delivery of Emergency Character Information 10e
  Identification Function
  Function to Deliver the Character information 10e
  In the following, each function will be further described in detail (see FIGS. 6, 7, and 8)

1. Server PC 20

1-1. Contents-Control Function (see FIGS. 6, 7, and 8)

1-1-0. Outline

The contents-control function controls the advertisement-contents data 10a and corresponding attached information such as client names.

1-1-1. Registration of Advertisement-Contents Data 10a and Attached Information

1. Registration

Contents themselves and the advertisement-contents data 10a are registered. The advertisement-contents data 10a includes the following.
  (1) Contents name
  (2) Date of registration in the server PC 20
  (3) Client name (Advertisement agent/client)
  (4) Location of display (an item of the terminal-attribute information 10c)
  (5) Data type (moving picture, still image)
  Client name includes a client name and an advertisement-agent name.
  As locations of display, more than one entries such as an area name, a railway station name, etc., are made.

2. Registered Advertisement-Contents Data 10a Can Be Edited and Deleted.

1-1-2. Search/Display of Advertisement-Contents Data 10a

1. A search is conducted based on a specified client name, a terminal-system name (an item of the terminal-attribute information 10c), or a contents name, and search results are displayed.
  A search is conducted based on a specified client name, a terminal-system name (an item of the terminal-attribute information 10c), or a contents name, and the advertisement-contents data 10a obtained as a result of the search is displayed.

1-2. Function to Control Terminal System (see FIGS. 6, 7, and 8)

1-2-0. Outline

1. Information necessary for controlling the terminal systems 30 is registered and controlled.

1-2-1. Function to Register Terminal-Attribute Information 10c

1. The terminal-attribute information 10c is registered. The terminal-attribute information 10c includes the following items.
  (1) Terminal-system name (identification number of the terminal system 30)
  (2) Telephone number
  (3) Location of Display
  (4) Advertisement-contents data 10a (see 1-1-1, 1.)
  (5) Display schedule of the advertisement-contents data 10a (see 1-4-1)
  (6) Advertisement-delivery-schedule data 10d of the advertisement-contents data 10a (see 1-5-1)

2. Registered terminal-attribute information 10c can be edited and deleted.

1-2-2. Function to Retrieve and Display Terminal-Attribute Information 10c

The terminal-attribute information 10c is retrieved based on a specified terminal-system name (an item of the terminal-attribute information 10c), and is displayed upon retrieval.

1-3. Remote Control Function to Control Terminal System 30 (see FIGS. 6, 7, and 8)

1-3-0. Outline

1. A function to specify a time to switch on/off the display device (large-scale plasma display 3021) is provided.

2. A function to automatically establish connection with the terminal systems 30 is provided.

1-3-1. Function to Control Switching On/Off of Terminal Systems 30

1. A setting is made with regard to when the plasma display 3021 of a given terminal system 30 is switched on and switched off.
  (1) The setting is made with respect to each terminal system 30.
  (2) The setting can be made on the spot by an operator operating the server PC 20.

1-3-2. Function to Connect to Terminal Systems 30

1. In order to establish connection with terminal systems 30,
  (1) telephone numbers (an item of the terminal-attribute information 10c) of the terminal systems 30 are specified; or
  (2) the terminal systems 30 are specified.
  Establishment of connection at the time of automatic delivery of the advertisement-contents data 10a is automatically performed based on what is specified in the advertisement-delivery-schedule data 10d.

1-4. Function to Set/Control Display-Schedule Data 10b (see FIGS. 6, 7, and 8)

1-4-0. Outline

1. A display schedule is specified with regard to which terminal systems 30 display the advertisement-contents data 10a and what time the contents are displayed.

1-4-1. Function to Set Display-Schedule Data 10b

1. The display-schedule data 10b regarding the advertisement-contents data 10a is laid out in preparation for subsequent transmission to the terminal systems 30.

The settings can be changed/deleted.

2. The display-schedule data 10b includes an identification number of a terminal system 30 (an item of the terminal-attribute information 10c), a contents name, a date and time for replay, and a number of replays.

3. It is possible to change/delete the display-schedule data 10b that has been already transmitted.

1-4-2. Function to Retrieve/Display Display-Schedule Data 10b

1. A search for a display schedule is made by specifying at least a client name, a terminal-system name, a contents name, or a date of replay, and search results are displayed.

1-5. Function to Set/Control Advertisement-Delivery-Schedule Data 10d (see FIGS. 6, 7, and 8)

1-5-0. Outline

A schedule for delivering the advertisement-contents data 10a from the server PC 20 to a given terminal system 30 is set as the advertisement-delivery-schedule data 10d. The advertisement-delivery-schedule data 10d specifies a date and time at which the advertisement-contents data 10a is automatically transmitted from the server PC 20 to the given terminal system 30.

In general, the delivery is made during a time period when the advertisement-contents data 10a is not being displayed.

1-5-1. Function to Register Advertisement-Delivery-Schedule Data 10d

1. The advertisement-delivery-schedule data 10d is set. The settings can be changed/deleted.

2. The advertisement-delivery-schedule data 10d includes a name of a destination terminal system (an item of the terminal-attribute information 10c), a name of the delivered contents, a client name, and a date and time of delivery.

1-5-2. Function to Retrieve/Display Advertisement-Delivery-Schedule Data 10d 1. A search for a delivery schedule is made by specifying at least a client name, a terminal-system name, a contents name, or a date of replay, and search results are displayed.

1-5-3. Function to Calculate a Time of Delivery

1. Function to Calculate/Display a Time of Delivery (1) A time of delivery (a start time, an end time, a total time period) can be calculated with respect to the advertisement-delivery-schedule data 10d for each terminal system 30, and can be displayed.

(2) A time of delivery can be calculated in advance with respect to each advertisement-contents data 10a, and can be displayed.

1-6. Function to Deliver Data (see FIGS. 6, 7, and 8)

1-6-1. Function to Deliver Advertisement-Contents Data 10a

1. The display-schedule data 10b and the advertisement-contents data 10a are sent to specified terminal systems 30 according to the delivery schedule set forth in advertisement-delivery-schedule data 10d.

2. Data delivery to the terminal systems 30 includes automatic delivery based on the advertisement-delivery-schedule data 10d and manual delivery based on user operations at the server PC.

1-7. Maintenance/Control Function (see FIGS. 6, 7, and 8)

1-7-0. Outline

This function attends to tasks relating to recording of a log for the purpose of maintenance/control of the multi-media-automatic-delivery system 10. Items for checking operations of the multi-media-automatic-delivery system 10 are displayed as they become necessary. Warnings are given as necessary.

1-7-1. Maintenance Function of Server PC 20

1. Function to Make Backup Copy

A backup copy of necessary data is created at constant intervals or at a time specified via user operation. Such a backup copy includes a copy of registered data.

2. Operations of the server PC 20 are tested, and test results are displayed as messages. A warning is given when an error is found.

3. Information necessary for maintenance purpose may be displayed and printed out.

Such information include the following.

(1) Name of contents (2) Type of contents (3) Time of event (4) Date and time of recovery from an error (5) Contents of event (6) Terminal-attribute information 10c

1-7-2. Maintenance Function for Terminal Systems 30 serving as Display

1. Function to Record Log Information

A function to receive and record a log of the terminal systems 30 is provided.

1-7-3. Maintenance Function for Terminal Systems 30 serving to transmit Character Information 10e 1. Information regarding transmission of the character information 10e is recorded/displayed. Such information includes the following.

(1) Character information 10e (2) Date and time of exchange of information (3) Identification number of a source terminal system 30 (an item of the terminal-attribute information 10c)

(4) Identification number of a sender obtained from the source terminal system 30

1-8. Security Function (see FIGS. 6, 7, and 8)

1-8-0. Outline

1. A function for protecting data from unauthorized access from within or outside the system is provided.

1-8-1. Security Function and Access Authorization to access Server PC 20

1. A function is provided to prevent unauthorized users from accessing or tampering with the server PC.

1-9. Function to Transmit Emergency Character Information 10e (see FIGS. 6, 7, and 8)

1-9-0. Outline

Character information 10e that is displayed in an emergency is transmitted from a transmission-purpose-dedicated terminal system 30 to display-purpose terminal systems 30 via the server PC 20.

The terminal systems 30 displays the character information 10e only when the server PC 20 can identify the source terminal system 30 and the operator thereof as a valid system and user.

1-9-1. Identification Function and Transmission Function

1. Identification is required when a dedicated terminal system 30 issues a request for transmission.

If identification is valid, the character information 10e is forwarded to the terminal systems 30. If identification is invalid, transmission is not forwarded.

An appropriate identification system is selected based on the consideration of its costs and performances.

2. Encoding System (see FIGS. 6, 7, and 8)

2-1. Function to Create Advertisement-Contents Data 10a

The advertisement-contents data 10a is created by using a separately provided system.

1. Encoding of Image Data (1) A required encoding system is used for encoding MPEG2 data.

(2) An encoding process is performed based on encoding parameters specified for MPEG2 and JPEG.

3. Operation of Server PC 20 (see FIG. 2)

1. Function to Deliver Advertisement-Contents Data 10a (1) The advertisement-contents data 10a created by a vendor is stored in memory media of the center system 20.

(2) The operator enters the advertisement-contents data 10a, a display schedule, the advertisement-delivery-schedule data 10d, and the terminal-attribute information 10c via the display.

(3) The advertisement-contents data 10a and the display-schedule data 10b are automatically transmitted to the terminal systems 30 in accordance with the advertisement-delivery-schedule data 10d.

[5] Terminal System 30 (Client PC) (see FIGS. 6, 7, 9, and 10)

In the following, a first embodiment of the terminal systems 30 will be described.

[5-1] Outline

A terminal system 30 according to the first embodiment is used as either a display-purpose terminal system 30 or a character-information-transmission-purpose terminal system 30 in the multi-media-automatic-delivery system 10, which has the following functional features.

[5-1-1] Outline of Functions of Multi-Media-Automatic-Delivery System 10

(1) Delivery of Advertisement-Contents Data 10a to Terminal Systems 30 via Communication Lines 11 and Automatic Display Function of Terminal Systems 30

The advertisement-contents data 10a is transmitted from the server PC 20 via ISDN lines (64 or 128 Kbps) by taking several times to several tens of times as long as a display time.

The terminal systems 30 accumulate the advertisement-contents data 10a, and display it according to a specified schedule.

(2) Function to Display Character Information 10e at Time of Emergency

The character information 10e is delivered and displayed on the terminal systems 30 so as to present information of an urgent nature at the time of an emergency such as earthquake.

[5-1-2] Communication Line 11: ISDN Lines 11 (64 Kbit/Sec or 128 Kbit/Sec)

[5-1-3] Displayed Contents: moving pictures, still images, and a combination thereof

[5-1-4] Types of Advertisement-Contents Data 10a (1) Moving Pictures
 a. MPEG2 data in the range of 6 Mbps is used.
 b. It takes one to three minutes to display one set of the advertisement-contents data 10a.
 c. The number of contents stored in one terminal system 30 is limited to 20 to 50.

(2) Still Images
 a. JPEG data with a resolution equivalent to a VGA level
 b. No limit to a time period during which the images are displayed (i.e., the images may be displayed for only a short period of time or for 24 hours)

[5-1-5] Character Message 10e at Time of Emergency (1) 5 to 30 characters per message (2) There are two cases, i.e., the first case in which the character information 10e is superimposed on the advertisement-contents data 10a and the second case in which the display of the advertisement-contents data 10a is suspended so as to present the character information 10e over the entire screen of the large-scale plasma display 3021.

(3) The character information 10e requires realtime handling thereof to a certain extent (i.e., needs to be displayed a few seconds to a few minutes aver the delivery thereof).

[5-1-6] Features of Multi-Media-Automatic-Delivery System 10

(1) The terminal systems 30 is provided with a function to display contents according to a specified schedule.

(2) Operation costs are low. Since the moving-picture-contents data 10a can be transmitted by taking time during a light-load time period such as a nighttime, there is no need to use communication lines 11 that offer a high-speed data transfer and a large capacity at a high cost.

In the following, each function will be further described in detail (see FIGS. 6, 7, 9, and 10)

1. Display-Purpose Terminal Systems 30

1-1. Displaying of Contents 1-1-0. Basic Function

The moving-picture-contents data 10a and the display-schedule data 10b are received from the server PC 20, and the moving-picture-contents data 10a is displayed according to a schedule specified in the display-schedule data 10b.

0.1-1-1. Function to Receive/Display Data

1. A function is provided to receive and store the moving-picture-contents data 10a and the display-schedule data 10b.

Data sent from the server PC 20 is received and stored.

2. The moving-picture-contents data 10*a* is displayed.

According to the received display schedule, the moving-picture-contents data 10*a* is displayed.

3. A mechanism is put in place to cope with a change in the display-schedule data 10*b* and the moving-picture-contents data 10*a* when the server PC 20 issues a request for a change.

1-1-2. Function to Delete Data

1. The display-schedule data 10*b* whose schedule has been worked through is deleted along with the moving-picture-contents data 10*a*.

1-2. Function to Display Emergency Character Information 10*e*

1-2-0. Basic Function

The character information 10*e* and the display-schedule data 10*b* are received in an emergency from a dedicated terminal system 30 via the server PC 20, and the character information 10*e* is displayed according to a schedule specified in the display-schedule data 10*b*.

1-2-1. Function to Receive/Display Data

1. Function to Receive/Store Data Sent from Server PC 20

Data sent from the server PC 20 is received and stored.

2. Display of the Moving-Picture-Contents Data 10*a*

According to the received display schedule, the character information 10*e* is displayed.

1-2-2. How to Display Character Information 10*e*

1. A change can be made to the way of presenting the character information 10*e* based on an instruction from the dedicated terminal system 30.

There are two ways of presentation.

(1) The character information 10*e* is displayed as superimposition on the currently displayed images.

There is no change to the display-schedule data 10*b* of the moving-picture-contents data 10*a*.

(2) Only the character information 10*e* is displayed.

If the moving-picture-contents data 10*a* is being displayed, displayed contents are erased from the screen for presenting the character information 10*e*. The canceled contents are not to be presented retroactively after the end of display of the character information 10*e*.

1-3. Maintenance/Control Function of Terminal System 30

1-3-0. Basic Function

1. The terminal-attribute information 10*c* is controlled.

2. A log of the terminal system 30 is recorded for the maintenance/control purposes, and is sent to the server PC 20.

A transmission is made in response to a transmission request from the server PC 20.

Operator operating the terminal system 30 can access the data that is used for the maintenance/control purposes.

1-3-1. Function to Control Terminal System 30

1. Function to Register Terminal System 30

The following items are registered through operator operations on the terminal system 30 or through instructions from the sever PC 20.

In addition to registration, a means is provided to add, change, and delete the registered items.

(1) Identification number of the terminal system 30 (an item of the terminal-attribute information 10*c*)

(2) Telephone number (an item of the terminal-attribute information 10*c*)

(3) Installed location (an item of the terminal-attribute information 10*c*)

(4) Type of display device (i.e., a plasma display 3021, a poster vision, etc.)

(5) Identification number(s) of the other terminal system(s) 30 when a twin or triple configuration is used (an item of the terminal-attribute information 10*c*)

The identification numbers are uniquely assigned. The contents of the registered items need to maintain consistency between the server PC 20 and the terminal system 30.

1-3-2. Function to Store Log Information and Send Same to Server PC 20

1. Timing to Transmit Log Information

Log information is recorded regarding all events occurred during operation. Record are such that access can be made to learn about a given event and to find a time of the event, a terminal system 30 suffering the event, the contents, and the client.

(1) Error of a terminal system 30

(2) Display status of the character information 10*e*

In addition to the above, the log is recorded in every manner that keeps a thorough record necessary for maintenance/control of the terminal system 30, and appropriate measures need to be taken.

1-4. Security Function 1-4-0. Basic Function

1. A means is provided to insure security against intruders.

Each of the terminal systems 30 is provided with an access authorization to access the server PC.

1-4-1. Security Function and Access Authorization to Access Server PC 20

1. Security Against Intrusion and Tampering

This function is provided to prevent unauthorized users from entering or tampering with the terminal systems 30 through the network.

An appropriate security measure is taken based on the consideration of costs (development/operation costs).

2. An access authorization is registered in the terminal systems 30 with respect to operators of the terminal systems 30.

3. Access Authorization to Access Server PC 20

A terminal system 30 without no access authorization cannot access the server PC 20.

A mechanism is put in place to allow the server PC 20 to distinguish authorized terminal systems 30 from unauthorized terminal systems 30.

1-5. Other Functions 1-5-0. Basic Function

1. The display device (plasma display 3021) is switched on/off according to a schedule transmitted from the server PC 20.

1-5-1. Function to Switch On/Off Terminal System 30

1. The display device (plasma display 3021) is controlled with respect to switching on/off thereof according to the schedule set by the server PC 20 or according to instructions given manually at the server PC 20.

2. Function to Create/Transmit Character Information 10e 2-1. Transmission of the Character Information 10e 2-1-0. Basic Functions 1. In emergency, the character information 10e is sent to the terminal systems 30 via the server PC 20. In doing so, access authorizations of a source terminal system 30 and an operator thereof are checked.

The server PC 20 forwards the character information 10e to the terminal systems 30 only when access authorizations are recognized.

2-1-1. Function to Create Character Information 10e

1. The character information 10e includes one created on the spot via manual entry and one selected from a data set provided in advance.

2. The character information 10e can be registered/edited/deleted.

The data set provided in advance includes data generated by a separate system.

2-1-2. Function to Create/Display Display-Schedule data 10b

1. Function to Create the Display-Schedule Data 10b

The display-schedule data 10b includes a display-start time, a display-end time, and an identification number of a terminal system 30 (an item of the terminal-attribute information 10c).

The schedule can be registered, edited, and deleted.

2. Function to Set the Way of Displaying on Monitor (1) A switch can be made between full-screen display and superimposition display.

2-1-3. Function to Transmit Data

1. A display-purpose terminal system 30 sends to the server PC 20 necessary data for displaying the character information 10e. Such data includes the character information 10e, a display schedule, display-control information, and identification data.

2-2. Security Function 2-2-0. Basic Function

A function is provided to insure security against an intruder from outside or tampering from inside. Security can also be controlled at transmission sites.

2-2-1. Security Function and Access Authorization to Access Server PC 20

1. Security Against Intrusion and Tampering

This function is provided to prevent unauthorized users from entering or tampering with the terminal systems 30 through the network.

An appropriate security measure is taken based on the consideration of costs (development/operation costs).

2. An access authorization is registered in the terminal systems 30 with respect to operators of the terminal systems 30.

3. Access Authorization to Access Server PC 20

A terminal system 30 and an operator thereof without no access authorization cannot access the server PC 20 (a mechanism is put in place to allow the server PC 20 to distinguish authorized terminal systems 30 from unauthorized terminal systems 30).

3. Structure of Transmission Data 3-1. Data Type 3-1-0. Basic Functions

Specifications regarding data formats of all data types including attached information and specifications of interface with the server PC 20 are created.

3-1-1. Advertisement-Contents Data 10a

1. Moving picture (MPEG2), still images (JPEG)

2. Each piece of contents has an identification number.

3. A contents name, a client name, a registration date, a set of target terminal systems 30, and data types are included as attached information.

3-1-2. Display-Schedule Data 10b of Advertisement-Contents Data 10a

1. A date and time of a start, a date and time of an end, and a number of repetitions may be included in the data structure to insure smooth display of contents in a specified order.

Second Embodiment

In what follows, a second embodiment of the multi-media-automatic-delivery system 10 will be described (see FIGS. 11, 12, 13, and 14).

The center system (server PC) 20 has the same configuration as that of the first embodiment, and a description thereof will be omitted. A description will be given with regard to the terminal systems 30.

[6] Terminal System 30 (Client PC)

[6-1] Outline

A system according to this embodiment is used as a network-delivery display system having the following features (1) and (2) among other features.

(1) Delivery of Multi-Media Data to Terminal Systems 30 Via Communication Lines 11 and Automatic Display Function of Terminal Systems 30

The multi-media data is transmitted from the server PC 20 via ISDN lines (64 or 128 Kbps) by taking several times to several tens of times as long as a display time.

The terminal systems 30 accumulate the moving-picture-contents data 10a, and display it according to a specified schedule.

(2) Function to Display Character Information 10e at Time of Emergency

The character information 10e is displayed in an emergency such as earthquake.

[6-1-2] Places of Installation of Display Terminal Systems 30 and Number of Installed Systems Systems are installed no only indoors but also outdoors. The number of installed systems may be about either 10 or 100.

[6-1-3] Communication Line 11: ISDN lines 11 (64 kbit/sec or 128 kbit/sec) or PIAFS communication (both are supported)

[6-1-4] Displayed Contents: moving pictures, still images, voice, and a combination thereof

[6-1-5] Types of Advertisement-Contents Data 10a (1) Moving Pictures a. MPEG data in the range of 6 Mbps (one type of the moving-picture-contents data 10a) is used.

b. It takes one to three minutes to display one set of the advertisement-contents data 10a.

c. The number of contents stored in one terminal system 30 is limited to 20 to 50.

(2) Still Images a. JPEG data with a resolution equivalent to a VGA level b. No limit to a time period during which the images are displayed (i.e., the images may be displayed for only a short period of time or for 24 hours)

(3) Voice a. An appropriate data format is used.

b. Voice may be provided in combination with moving pictures and still images, or may be provided alone.

[6-1-6] Character Message 10e at Time of Emergency (1) 5 to 30 characters per message (2) There are two cases, i.e., the first case in which the character information 10e is superimposed on the advertisement-contents data 10a and the second case in which the display of the advertisement-contents data 10a is suspended so as to present the character information 10e over the entire screen of the large-scale plasma display 3021.

(3) The character information 10e requires realtime handling thereof to a certain extent (i.e., needs to be displayed a few seconds to a few minutes aver the delivery thereof).

[6-1-7] Features of Multi-Media-Automatic-Delivery System 10

(1) The terminal systems 30 is provided with a function to display contents according to a specified schedule.

(2) Operation costs are low. Since the moving-picture-contents data 10a can be transmitted by taking time during a light-load time period such as a nighttime, there is no need to use communication lines 11 that offer a high-speed data transfer and a large capacity at a high cost.

[6-2] Others

In the following, each function of the terminal systems 30 according to the second embodiment will be further described in detail.

1. Functions of Terminal Systems 30

1-1. Function to Display Contents 1-1-0. Outline

The moving-picture-contents data 10a and the display-schedule data 10b are received from the server PC 20, and the moving-picture-contents data 10a is displayed according to a schedule specified in the display-schedule data 10b.

1-1-1. Function to Receive/Display Data

1. A function is provided to receive and store the moving-picture-contents data 10a and the display-schedule data 10b.

Data sent from the server PC 20 is received and stored.

A data format of the advertisement-contents data 10a is checked, and the server PC 20 is notified if the check finds abnormality.

2. The moving-picture-contents data 10a is displayed.

According to the received display schedule, the moving-picture-contents data 10a is displayed.

3. A mechanism is put in place to cope with a change in the display-schedule data 10b and the moving-picture-contents data 10a when the server PC 20 issues a request for a change.

1-1-2. Function to Delete Data

1. The display-schedule data 10b whose schedule has been worked through is deleted along with the moving-picture-contents data 10a.

1-2. Function to Display Emergency Character Information 10e 1-2-0. Basic Function The character information 10e, a display schedule, and character-display-control information are received in an emergency from a dedicated terminal system 30 via the server PC 20, and the character information 10e is displayed according to a schedule specified in the display-schedule data 10b.

1-2-1. Function to Receive/Display Data

1. Function to Receive/Store Data Sent from Server PC 20

Data sent from the server PC 20 is received and stored.

2. Display of Character Moving-Picture-Contents Data 10a

According to the received display schedule, the character information 10e is displayed.

1-2-2. How to Display Character Information 10e

1. The character information 10e is displayed according to the character-display-control information.

The character-display-control information includes the following settings.

(1) Presentation through superimposition on the currently displayed image

In this case, the display-schedule data 10b of the advertisement-contents data 10a is not changed.

(2) Presentation of characters alone on the screen

If the moving-picture-contents data 10a is being displayed, displayed contents are erased from the screen for presenting the character information 10e. The canceled contents are not to be presented retroactively after the end of display of the character information 10e.

1-3. Maintenance/Control Function of Terminal System 30

1-3-0. Outline

1. The terminal-attribute information 10c is controlled.

2. A log of the terminal system 30 is recorded for the maintenance/control purposes, and is sent to the server PC 20.

A transmission is made as a voluntary action of the terminal system 30, or is made in response to a transmission request from the server PC 20.

3. An automatic diagnosis function and a remote diagnosis function are provided.

Operator operating the terminal system 30 can access the data that is used for the maintenance/control purposes.

1-3-1. Function to Control Terminal System 30

1. Function to Register Terminal System 30

The following items are registered through operator operations on the terminal system 30 or through instructions from the sever PC 20.

In addition to registration, a means is provided to add, change, and delete the registered items.

(1) Identification number of the terminal system 30 (an item of the terminal-attribute information 10*c*)

(2) Telephone number (an item of the terminal-attribute information 10*c*)

(3) Installed location (an item of the terminal-attribute information 10*c*)

(4) Type of display device (i.e., a plasma display 3021, a poster vision, etc.)

(5) Identification number(s) of the other terminal system(s) 30 when a twin or triple configuration is used (an item of the terminal-attribute information 10*c*)

The identification numbers are uniquely assigned. The contents of the registered items need to maintain consistency between the server PC 20 and the terminal system 30.

1-3-2. Function to Diagnose System

1. A self-diagnosis function and a remote diagnosis function are provided.

Self-diagnosis function: an operation test is automatically conducted by the terminal system 30 on its own.

Remote-diagnosis function: an operation test on the terminal system 30 is conducted via remote control by the server PC 20.

The following tests are conducted with necessary logs being recorded and results of the tests being sent to the server PC 20.

(1) Test on communications with the server PC 20

(2) Test on displaying of the advertisement-contents data 10*a*

(3) Test on operations of the monitor camera (the remote diagnosis also includes a test to transmit a captured picture to the server PC 20)

(4) Test on displaying of the character information 10*e*

(5) Other tests necessary for system diagnosis

2. A time to conduct a self diagnosis can be specified by either the terminal system 30 or the server PC 20.

3. The self-diagnosis can also be conducted via operator operations on the terminal system 30.

1-3-3. Function to Store Log Information and Send same to Server PC 20

1. Timing to Transmit Log Information

Log information is recorded regarding all events occurred during operation and results of the diagnoses. Record are such that access can be made to learn about a given event and to find a time of the event, a terminal system 30 suffering the event, the contents, and the client.

(1) Communication error (transmission upon error occurrence)

(2) Power failure of the terminal system 30 (transmission upon power failure)

(3) Error of the terminal system 30 (transmission upon error occurrence)

(4) Transmission status of emergency character information 10*e* (transmission to the server PC 20 everyday at such a time as the display operation is stopped for the day)

(5) Total time of display operations of the terminal system 30 (i.e., for the purpose of informing of a time of device replacement)

In addition to the above, the log is recorded in every manner that keeps a thorough record necessary for maintenance/control of the terminal system 30, and appropriate measures need to be taken.

1-3-4. Function to Cope with Power Failure

1. Emergency power that is not affected by a power-cut is used as a measure against a power failure.

2. To cope with a situation in which a long power failure incapacitates the emergency power, the terminal system 30 is designed so as to be restarted via remote control from the server PC 20 or via operator operations on the terminal system 30.

1-3-5. Remote Maintenance of Software of Terminal System 30

1. Software of the terminal system 30 can be updated, be maintained, be installed, and be modified for changing settings thereof via remote control from the server PC 20.

Note: when commercially-available remote-access software is used, terminal systems 30 for installing software can be specified.

1-4. Security Function 1-4-0. Outline

1. A means is provided to insure security against intruders.

Each of the terminal systems 30 is provided with an access authorization to access the server PC.

1-4-1. Security Function and Access Authorization to Access Server PC 20

1. Security Against Intrusion and Tampering

This function is provided to prevent unauthorized users from entering or tampering with the terminal systems 30 through the network.

An appropriate security measure is taken based on the consideration of costs (development/operation costs).

2. An access authorization is registered in the terminal systems 30 with respect to operators of the terminal systems 30.

3. Access Authorization to Access Server PC 20

A terminal system 30 without no access authorization cannot access the server PC 20.

(A mechanism is put in place to allow the server PC 20 to distinguish authorized terminal systems 30 from unauthorized terminal systems 30.)

1-5. Other Functions 1-5-0. Outline

1. Synchronization is established between the server PC 20 and the terminal systems 30.

2. The display device (plasma display 3021) is switched on/off according to a schedule transmitted from the server PC 20.

3. A switch is made from one display device to another according to an instruction from the server PC 20.

4. The display device is taken a picture of, and the picture is transmitted to the server PC 20.

1-5-1. Function to Correct Time Setting of Terminal System 30

A clock of the multi-media-automatic-delivery system 10 is adjusted.

1. A time difference between the server PC 20 and the terminal systems 30: less than ±5 seconds 2. A time difference between the terminal systems 30 forming a twin or triplet configuration: less than ±2 seconds 3. A time difference between the servers (when there are more than one server PC 20): less than ±5 seconds 1-5-2. Function to Switch On/Off Terminal System This function is provided separately for the terminal system PC and the large-scale plasma display 3021.

1. The display device is controlled with respect to switching on/off thereof according to the schedule set in advance by the server PC 20 or according to instructions given manually at the server PC 20 on the spot.

2. The terminal system PC can be switched on/off through operator operations on the server PC 20.

1-5-3. Switching of Display Device

According to a switch instruction sent from the server PC 20 or operations entered into the terminal system 30, a choice can be made between a display-purpose terminal system 30 and a TV monitor.

2. Function to Create/Transmit Emergency Character Information 10e

2-1. Transmission of the Character Information 10e

2-1-0. Outlines

A detailed mechanism of creating/transmitting the character information 10e is specified in the specification, and is dependent on the locations where the terminal systems 30 are installed, the number of terminal systems 30, and the means of communication.

The following items are listed based on an assumption that a dedicated terminal system 30 is installed.

1. In an emergency, the character information 10e is sent to the display-purpose terminal systems 30 via the server PC 20.

In doing so, access authorizations of a source terminal system 30 and an operator thereof are checked.

The server PC 20 forwards the character information 10e to the display-purpose terminal systems 30 only when access authorizations are recognized.

2-1-1. Function to Create Character Information

1. The character information 10e includes one created on the spot via manual entry and one selected from a data set provided in advance.

2. The character information 10e can be registered/edited/deleted.

The data set provided in advance includes data generated by a separate system.

2-1-2. Function to Create/Display Display-Schedule data 10b

1. Function to Create the Display-Schedule Data 10b

The display-schedule data 10b includes a display-start time, a display-end time, and an identification number of a terminal system 30 (an item of the terminal-attribute information 10c).

The schedule can be registered, edited, and deleted.

2. Function to Set the Way of Displaying on Monitor (1) A switch can be made between full-screen display and superimposition display.

(2) A character size can be chosen.

2-1-3. Function to Transmit Data

1. A display-purpose terminal system 30 sends to the server PC 20 necessary data for displaying the character information 10e. Such data includes the character information 10e, a display schedule, display-control information, and identification data.

2-2. Function to Maintain/Control Dedicated Terminal System 30

2-2-0. Outline

1. The terminal-attribute information 10c is controlled.

2. A necessary diagnosis is given to the multi-media-automatic-delivery system 1. Function to provide a diagnosis includes an automatic diagnosis function and a remote diagnosis function.

2-2-1. Function to Control Terminal System 30

1. Function to Control the Terminal-Attribute Information 10c

The terminal-attribute information 10c is registered in order to control the terminal systems 30. In addition to new registration, such functions are provided as to change/delete the registered items.

There is a need to insure consistency of the terminal-attribute information 10c between the server PC 20 and the terminal systems 30.

2-2-2. System-Diagnosis Function

1. An automatic diagnosis function and a remote diagnosis function are provided.

(1) Test on communications with the server PC 20

(2) Test on data transmission (3) Other system-diagnosis tests which are deemed necessary 2-3. Security Function 2-3-0. Outline A function is provided to insure security against an intruder from outside.

Identification needs to be recognized by the server PC 20 when transmitting the character information 10e.

2-3-1. Security Function and Access Authorization to Access Server PC 20

1. Security Against Intrusion and Tampering

This function is provided to prevent unauthorized users from entering or tampering with the terminal systems 30 through the network.

An appropriate security measure is taken based on the consideration of costs (development/operation costs).

2. An access authorization is registered in the terminal systems 30 with respect to operators of the terminal systems 30.

3. Access Authorization to Access Server PC 20

A terminal system 30 and an operator thereof without no access authorization cannot access the server PC 20. A mechanism is put in place to allow the server PC 20 to distinguish authorized terminal systems 30 from unauthorized terminal systems 30.

3. Structure of Transmission Data 3-1. Data Type 3-1-0. Outline

Specifications regarding data formats of all data types including attached information and specifications of interface with the server PC 20 are created.

3-1-1. Advertisement-Contents Data 10a

1. Moving picture (MPEG2), still images (JPEG), voice

2. Each piece of contents has an identification number.

3. A contents name, a client name, a registration date, a set of target terminal systems 30, and data types are included as attached information.

3-1-2. Display-Schedule Data 10b of Advertisement-Contents Data 10a

1. A date and time of a start, a date and time of an end, and a number of repetitions may be included in the data structure to insure smooth display of contents in a specified order.

A date and time of a start, a date and time of an end, a number of repetitions, and the like are specified by the client.

3-1-3. Character Information 10e

1. Each piece of the character information 10e has an identification number assigned thereto.

2. A date and time of transmission, a date and time of display, and an identification number (an item of the terminal-attribute information 10c) of the terminal system 30 are included as attached information.

As described above, the present invention provides the following advantages. Even when moving-picture information or high-definition images having a large amount of multi-media data in the range of several hundreds megabytes is sent from the center system to the terminal systems for the purpose of delivering commercials on sales goods, notices from a local community, traffic information, a local weather forecast, or the like, the contents are delivered during a time period when the communication-line-usage fee is relatively inexpensive, the purpose being to avoid an increase in a communication-line-usage fee caused by use of the communication lines during a daytime for a long time period for delivering a large amount of the data. In this manner, the light-load-time-period-remote-casting function is implemented at a low cost so as to cope with the delivery of multi-media data such as moving pictures or high-definition images. Further, even when moving-picture information or high-definition images having a large amount of multi-media data in the range of several hundreds megabytes is sent from the center system to the terminal systems for the purpose of delivering commercials on sales goods, notices from a local community, traffic information, a local weather forecast, or the like, the contents are delivered during a time period when the terminal systems are idling, the purpose being not to require the terminal systems to have a high-performance capacity and not to require the communication lines to have a high-speed-data-transfer capacity so as to avoid a cost increase associated with enhancement of the terminal systems and to avoid an increase in a communication-line-usage fee caused by use of a high-speed-data-transfer network. In this manner, the light-load-time-period-remote-casting function is implemented at a low cost so as to cope with delivery of multi-media data such as moving pictures or high-definition video images. Moreover, based on the function to control the contents-delivery-schedule data, the contents are changed for each of the terminal systems based on the characteristics of the individual terminal systems so as to take into account a season, a date, a day, locations of the terminal systems, etc. Such a function is implemented as the light-load-time-period-remote-casting function. As a result, it is possible to eliminate time and labor that would be spent on recording the contents in recording media such as magneto-optical memory media or magnetic disks at the site of the center system. Also, time and labor spent on the delivery of the recording media to the terminal systems are eliminated. Further, there is no need to spend time and labor on loading the recording media to the reading devices of the terminal systems so as to store the contents in the terminal systems. In this manner, the light-load-time-period-remote-casting function is implemented so as to eliminate a need for time and labor to be spent on recording of contents in memory media, delivery of the memory media, and reading of contents from the memory media. Namely, the remote-delivery function directed to delivery of high-definition moving pictures (i.e., the light-load-time-period-remote-casting function) can be achieved economically by using existing infrastructure, whereas such a function cannot be implemented in the related-art schemes which are based on either delivery of recording media or one-way delivery of contents.

Further, the present invention is not limited to these embodiments, but various variations and modifications may be made without departing from the scope of the present invention.

What is claimed is:

1. A delivery system for delivering a plurality of contents, comprising:

a center system configured to deliver the plurality of contents;

a plurality of terminal apparatuses configured to receive the plurality of contents from the center system and to display the plurality of contents; and communication lines connecting said center system to said plurality of terminal apparatuses and configured to transmit the plurality of contents, wherein said center system comprises:

a delivery-schedule setting unit configured to set a schedule of delivery of the plurality of contents;

a content-delivery unit configured to identify the contents to be delivered to one of the terminal apparatuses based on attribute information indicative of at least one characteristic of the one of the terminal apparatuses and to deliver the contents to the one of the terminal apparatuses, wherein the one of the terminal apparatuses sends the center system a picture of a screen of said the one of the terminal apparatuses on which the contents received from the center system is displayed; and a remote monitoring unit configured to determine based on the received picture of the screen of said one of the terminal apparatuses whether any of the plurality of contents are displayed on the screen of said the one of the terminal apparatuses.

2. The delivery system as claimed in claim 1, further comprising an output schedule setting unit configured to set an output schedule as the attribute information of the one of the terminal apparatuses, said output schedule defining a schedule according to which the contents to be delivered to and stored at the one of the terminal apparatuses are displayed at the one of the terminal apparatuses, and wherein the output schedule set by the output schedule setting unit is transmitted to the one of the terminal apparatuses.

3. The delivery system as claimed in claim 2, wherein the delivery schedule setting unit is configured to set a delivery schedule as the attribute information of the one of the terminal apparatuses, said delivery schedule defining a schedule according to which contents are delivered during a low utilization period in which a utilization of the one of the terminal apparatuses drops below a predetermined level.

4. The delivery system as claimed in claim 3, wherein the delivery schedule setting unit derives the utilization of the one of terminal apparatus apparatuses based on a preset output schedule.

5. The delivery system as claimed in claim 3, wherein the delivery schedule setting unit includes a delivery scheduling function to control the delivery of the contents identified for the one of the terminal apparatuses based on the delivery schedule already set for the one of the terminal apparatuses and the output schedule already transmitted to the one of the terminal apparatuses.

6. The delivery system as claimed in claim 3, wherein the delivery schedule setting unit is provided with a function to modify a currently effective delivery schedule, and wherein when the delivery schedule is to be newly set for the one of the terminal apparatuses to deliver new contents to the one of the terminal apparatuses, said function derives an available time according to the output schedule and the delivery schedule and a time required to deliver the contents based on the output schedule and delivery schedule currently set for the one of the terminal apparatuses and the low utilization period of the one of the terminal apparatuses.

7. The delivery system of claim 2, wherein the output schedule transmitted to the one of the terminal apparatuses includes a date and time for display of the contents on the screen of the one of the terminal apparatuses.

8. A contents delivery method for delivering contents to be stored and displayed at a terminal apparatus that is connected thereto via a network, comprising:
 causing a contents storing unit to store contents to be delivered to the terminal apparatus;
 causing an attribute information storing unit to store attribute information indicative of at least one characteristic of the terminal apparatus on a terminal-apparatus-specific basis;
 identifying the contents to be delivered to the terminal apparatus among the contents stored in the contents storing unit based on the attribute information of the terminal apparatus;
 retrieving the identified contents from the contents storing unit for delivery to the terminal apparatus;
 delivering the identified contents to the terminal apparatus;
 receiving a picture of a screen of said terminal apparatus on which the contents is displayed; and
 determining, based on the received picture of the screen of said terminal apparatus, whether any of the plurality of contents are displayed on the terminal apparatus.

9. The contents delivery method as claimed in claim 8, further comprising:
 setting an output schedule as the attribute information of the terminal apparatus, said output schedule defining a schedule according to which the contents to be delivered to and stored at the terminal apparatus are displayed at the terminal apparatus; and
 transmitting the output schedule to the terminal apparatus.

10. The contents delivery method as claimed in claim 9, further comprising setting a delivery schedule as the attribute information of the terminal apparatus, said delivery schedule defining a schedule according to which contents are delivered during a low utilization period in which a utilization of the terminal apparatus drops below a predetermined level.

11. The contents delivery method as claimed in claim 10, wherein the utilization of the terminal apparatus is derived based on a preset output schedule.

12. The contents delivery method as claimed in claim 10, wherein the delivery of the contents identified for the terminal apparatus is controlled by referring to the delivery schedule set for the terminal apparatus.

13. The contents delivery method as claimed in claim 10, wherein when the delivery schedule is to be newly set for the terminal apparatus, a currently effective delivery schedule is modified by deriving an available time according to the output schedule and the delivery schedule and a time required to deliver the contents based on the output schedule and delivery schedule currently set for the terminal apparatus and the low utilization period of the terminal apparatus.

14. The method of claim 9, wherein the output schedule transmitted to the terminal apparatus includes a date and time for display of the contents on the screen of the terminal apparatus.

* * * * *